(12) United States Patent
Maximo et al.

(10) Patent No.: US 7,831,034 B2
(45) Date of Patent: Nov. 9, 2010

(54) MANAGEMENT OF TELEPHONE CALL ROUTING USING A DIRECTORY SERVICES SCHEMA

(75) Inventors: Rui Y. Maximo, Issaquah, WA (US);
Dan A. Knudson, Redmond, WA (US);
Vadim Eydelman, Redmond, WA (US);
Mahendra Sekaran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1116 days.

(21) Appl. No.: 11/489,831

(22) Filed: Jul. 20, 2006

(65) Prior Publication Data

US 2008/0043976 A1 Feb. 21, 2008

(51) Int. Cl.
*H04L 12/66* (2006.01)
(52) U.S. Cl. .............. 379/352; 379/114.02; 379/221.01
(58) Field of Classification Search ............ 379/114.02, 379/220.01, 221.01
See application file for complete search history.

(56) References Cited

U.S. PATENT DOCUMENTS

| | | | |
|---|---|---|---|
| 5,724,408 A | | 3/1998 | Morganstein |
| 5,862,334 A | * | 1/1999 | Schwartz et al. ............ 709/223 |
| 6,000,031 A | | 12/1999 | Bingaman et al. |
| 6,539,077 B1 | | 3/2003 | Ranalli et al. |
| 6,909,708 B1 | | 6/2005 | Krishnaswamy et al. |
| 7,339,934 B2 | * | 3/2008 | Mussman et al. ...... 370/395.21 |
| 7,720,794 B2 | * | 5/2010 | Wood ................................. 1/1 |
| 2003/0091028 A1 | * | 5/2003 | Chang et al. ................. 370/352 |
| 2006/0004729 A1 | * | 1/2006 | Zhilyaev et al. ................ 707/3 |
| 2006/0010206 A1 | * | 1/2006 | Apacible et al. ............ 709/205 |
| 2006/0072726 A1 | * | 4/2006 | Klein et al. ............ 379/201.01 |
| 2006/0136585 A1 | * | 6/2006 | Mayfield et al. ............ 709/224 |
| 2006/0217112 A1 | * | 9/2006 | Mo ......................... 455/422.1 |
| 2007/0192823 A1 | * | 8/2007 | Andersen et al. ............... 726/1 |

OTHER PUBLICATIONS

International Search Report and Written Opinion mailed for PCT application PCT/US2007/016332, mailed Jan. 10, 2008, 9 pages.

* cited by examiner

*Primary Examiner*—Creighton Smith

(57) ABSTRACT

Directory services schema for telephone call management. The schema facilitates the development of call routing rules as one or more instances of one or more classes. Once created, the rules can be propagated to all other director services servers, and any subsequent updates and system changes are readily propagated to maintain optimum call system management. The rules can be stored in a routing table allowing administrators to define phone routes for various scenarios. System hardware/software changes can be managed using distinguished names and automatically propagated (or replicated) to the other directory services servers on an enterprise network. The architecture includes a schema component for generating a directory services schema, and a call routing component that routes telephone calls according to call routing rules defined by the directory services schema. The rules can be processed in combination with policies of usage attributes and phone number patterns/ranges to manage call routing.

20 Claims, 21 Drawing Sheets

| Setting # | SETTING | PROPERTY (e.g., WMI PROPERTY) | VALID VALUES | DEFAULT | UI EXPERIENCE |
|---|---|---|---|---|---|
| C1 | ROUTING RULE INSTANCE ID | MSFT_SIPPhoneRouteSetting::InstanceID | | | NEVER AVAILABLE |
| C2 | PH # RANGE/ PATTERN TO GATEWAYS | MSFT_SIPPhoneRouteSetting::TargetPhoneNumbers | UNICODE STRING TO 1024 CHARACTERS | NULL | ALWAYS AVAILABLE |
| C3 | LIST OF GATEWAYS TO ROUTE | MSFT_SIPPhoneRouteSetting::GatewayList | UNICODE STRING ARRAY (FQDN:PORT) TO 256 CHARACTERS | NULL | ALWAYS AVAILABLE |
| C4 | PHONE ROUTE USAGE | MSFT_SIPPhoneRouteSetting::PhoneUsage | ARRAY OF MSFT_SIPPhoneRoute UsageData::UsageDNs | | ALWAYS AVAILABLE |
| C5 | PHONE ROUTE DESCR. | MSFT_SIPPhoneRouteSetting::Description | UNICODE STRING TO 1024 CHARACTERS | NULL | ALWAYS AVAILABLE |
| C6 | PHONE ROUTE FRIENDLY NAME | MSFT_SIPPhoneRouteSetting::Name | UNICODE STRING TO 1024 CHARACTERS | NULL | ALWAYS AVAILABLE |
| C7 | PHONE ROUTE TRANSLATION | MSFT_SIPPhoneRouteSetting::Translation | UNICODE STRING TO 1024 CHARACTERS | | ALWAYS AVAILABLE |
| C8 | PHONE USAGE INSTANCE ID | MSFT_SIPPhoneRouteUsageData::InstanceID | | | NEVER AVAILABLE |
| C9 | DN OF OBJECT | MSFT_SIPPhoneRouteUsageData::UsageDN | DNs | | NEVER AVAILABLE |
| C10 | USAGE ATTRIBUTE NAME | MSFT_SIPPhoneRouteUsageData::Attribute | UNICODE STRING TO 256 CHARACTERS | NULL | ALWAYS AVAILABLE |
| C11 | USAGE DESCRIPTION | MSFT_SIPPhoneRouteUsageData::Description | UNICODE STRING TO 1024 CHARACTERS | NULL | ALWAYS AVAILABLE |
| C12 | USAGE ATTACHMENT | MSFT_SIPPhoneRouteUsageData::Attach | UNICODE STRING TO 1024 CHARACTERS | NULL | ALWAYS AVAILABLE |

*FIG. 4*

| USAGE ATTRIBUTE (SHORT, USER FRIENDLY NAME STRING) | DESCRIPTION |
|---|---|
| LOCAL | $ |
| LONG-DISTANCE | $$ |
| CITY1 | CITY1 FTE ATTRIBUTE |
| CITY2 | CITY2 FTE ATTRIBUTE |
| CITY2 TEMPS | CITY2 TEMPORARY EMPLOYEE ATTRIBUTE |
| CITY3 | CITY3 FTE ATTRIBUTE |

*FIG. 5*

| USERS CATEGORY (GROUP OR PER USER) | POLICY OF USAGE ATTRIBUTES (ORDER COUNTS) |
|---|---|
| CITY1\DOMAIN USERS | CITY1 |
| CITY2\DOMAIN USERS | LOCAL LONG-DISTANCE CITY2 |
| CITY2\EXECUTIVES | LOCAL LONG-DISTANCE CITY2 CITY3 |
| CITY2\TEMPS | CITY2TEMPS |
| CITY3\DOMAIN USERS | LOCAL LONG-DISTANCE CITY3 |
| CITY3\EXECUTIVES | LOCAL LONG-DISTANCE CITY3 CITY2 |

*FIG. 6*

| ROUTE | PATTERN | USAGE ATTRIBUTES | NEXT HOPS |
|---|---|---|---|
| CITY1-ALL | * | CITY1 | CITY1-GW.CORP.123.COM:PORT |
| CITY2-LOCAL | +1[425,206] | LOCAL CITY2TEMPS | CITY2-GW.CORP.123.COM:PORT |
| CITY2-LD | +1* | LONG-DISTANCE | CITY2-GW.CORP.123.COM:PORT |
| CITY2-DEF | * | CITY2 | CITY2-GW.CORP.123.COM:PORT |
| CITY3-LOCAL | +41[1,43,44]* | LOCAL | CITY3-GW.CORP.123.COM:PORT |
| CITY3-LD | +41* | LONG-DISTANCE | CITY3-GW.CORP.123.COM:PORT |
| CITY3-DEF | * | CITY3 | CITY3-GW.CORP.123.COM:PORT |

*FIG. 7*

SCHEMA msRTCSIP-RouteUsages

> *msRTCSIP-RouteUsage*
>> msRTCSIP-RouteUsageAttribute
>> msRTCSIP-Description msRTCSIP-PhoneRoutes > *msRTCSIP-PhoneRoute*
>> msRTCSIP-PhoneRouteName
>> msRTCSIP-TargetPhoneNumbers
>> msRTCSIP-Gateways
>> msRTCSIP-PhoneUsage
>> msRTCSIP-Description
>> msRTCSIP-PhoneRouteData msRTCSIP-Policies > *msRTCSIP-GlobalUserPolicy*
>> msRTCSIP-PolicyType
>> msRTCSIP-DefaultPolicy
>> msRTCSIP-PolicyContent
>> msRTCSIP-PolicyData msRTCSIP-TrustedMediationGateways > *msRTCSIP-TrustedMediationGateway*
>> msRTCSIP-TrustedMediationGatewayFQDN
>> msRTCSIP-TrustedMediationGatewayType
>> msRTCSIP-TrustedServerVersion
>> msRTCSIP-TrustedMediationGatewayData

*FIG. 15*

MANAGEMENT OF TELEPHONE CALL ROUTING USING A DIRECTORY SERVICES SCHEMA

BACKGROUND

The expansion of corporations over multiple geographic locations locally, regionally, nationally and even internationally places an extra burden on the information management resources. Enterprise networks provide a means of interconnecting these locations in support of IP- and telephone-based communications. Both IP and telephone systems management play an important role in the corporation maintaining a competitive posture in industry.

Many companies employ PBX (private branch exchange) telephone systems to manage large numbers of calls between employees, customers, and/or vendors. Typically, PBXs can require configuration on an individual system level. Thus, telephone system administrators are required at each company PBX location, or if not, assigned to systems in the area so that configuration and troubleshooting can be conducted in a relatively expedient manner. This limitation demands not only extra resources to administer multiple separate systems management, but adds to the cost for technology management when companies have enterprise networks that can include a number of PBXs to handle company telephone communications. Moreover, when the corporations are international, which is a growing trend in an expanding global economy, it can be vitally important to maintain the integrity of the telephone communications system. Equipment failures, hardware/software update processes and/or offline functions can all impact the bottom line of the company. Accordingly, in large corporate environments or even smaller companies that outsource such management responsibilities can require 24-hour oversight management by personnel to address system problems.

Furthermore, where corporate locations are in different countries, each country can have different regulatory compliance restrictions when, for example, a VoIP (voice-over-IP) call traverses from a global communications network such as the Internet to the local or public switched telephone network (or PSTN). A VoIP telephony system is a dynamic system comprised of multiple interdependent parts. When a gateway goes down or is removed from the system, the phone routing rules must be updated dynamically to prevent lost calls. Moreover, in order to sell VoIP products and solutions in those countries, compliance with national regulations must be closely monitored and followed. Additionally, changing regulations can be difficult and complex to accommodate, let alone anticipate in the design of hardware and/or software that drive the telephone systems and networks. Thus, the capability to efficiently manage telephone system operations can have a significant impact on the success or failure of a company.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a mechanism for efficiently handling telephone management hardware and/or software at multiple telephone systems (e.g., associated with an enterprise system). This is accomplished by implementation of a directory services schema for call management. Directory services allow a user to find any object (e.g., user, system, resource and service) based on one or more of the object attributes by querying the directory to obtain a list of objects that match the attributes. The schema can be modified to implement new types of objects or object properties.

Utilization of the disclosed architecture means that no longer is the administrator required to specify routing rules on each individual telephone system (e.g., a PBX-private branch exchange). Moreover, rather than using database tables consisting of fields and records to represent the rules, the rules are represented as instances of a class. By using a usage table that administrators can define, this allows administrators the flexibility to create phone routes for various scenarios. For example, when an administrator removes a gateway or deletes a usage policy from the system, using the distinguished name (DN), the phone routing rules can be automatically updated. In other words, a rule changed at one server (running the directory service) is automatically propagated (or replicated) to the other directory services servers on the network. Thus, the integrity of the phone routes is maintained preventing calls from going to a "dead" gateway.

In support thereof, disclosed and claimed herein is a computer-implemented system that facilitates call management. The system includes a schema component for generating a directory services schema, and a call routing component that routes telephone calls according to call routing rules defined by the directory services schema. The rules are processed to cause the routing component to route the calls over a telephone communications framework (e.g., PSTN-public switched telephone network, cellular network). In yet another example, the call routing component routes the calls over the telephone communications framework, which includes interfacing to a VoIP (voice-over-IP) communications system.

In yet another alternative implementation, a machine learning and reasoning component is employed that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 4 illustrates a table of one exemplary set of APIs that can be employed in the directory service.

FIG. 5 illustrates an exemplary attribute table for defining usage attributes using short user-friendly name strings.

FIG. 6 illustrates an exemplary users table for associating one or more users with the policies of the usage attributes defined in FIG. 5.

FIG. 7 illustrates an exemplary routing table.

FIG. 15 illustrates one exemplary schema for distributed directory services and rules classes/attribute definitions in accordance with the disclosed call routing architecture.

DETAILED DESCRIPTION

Figure 1:
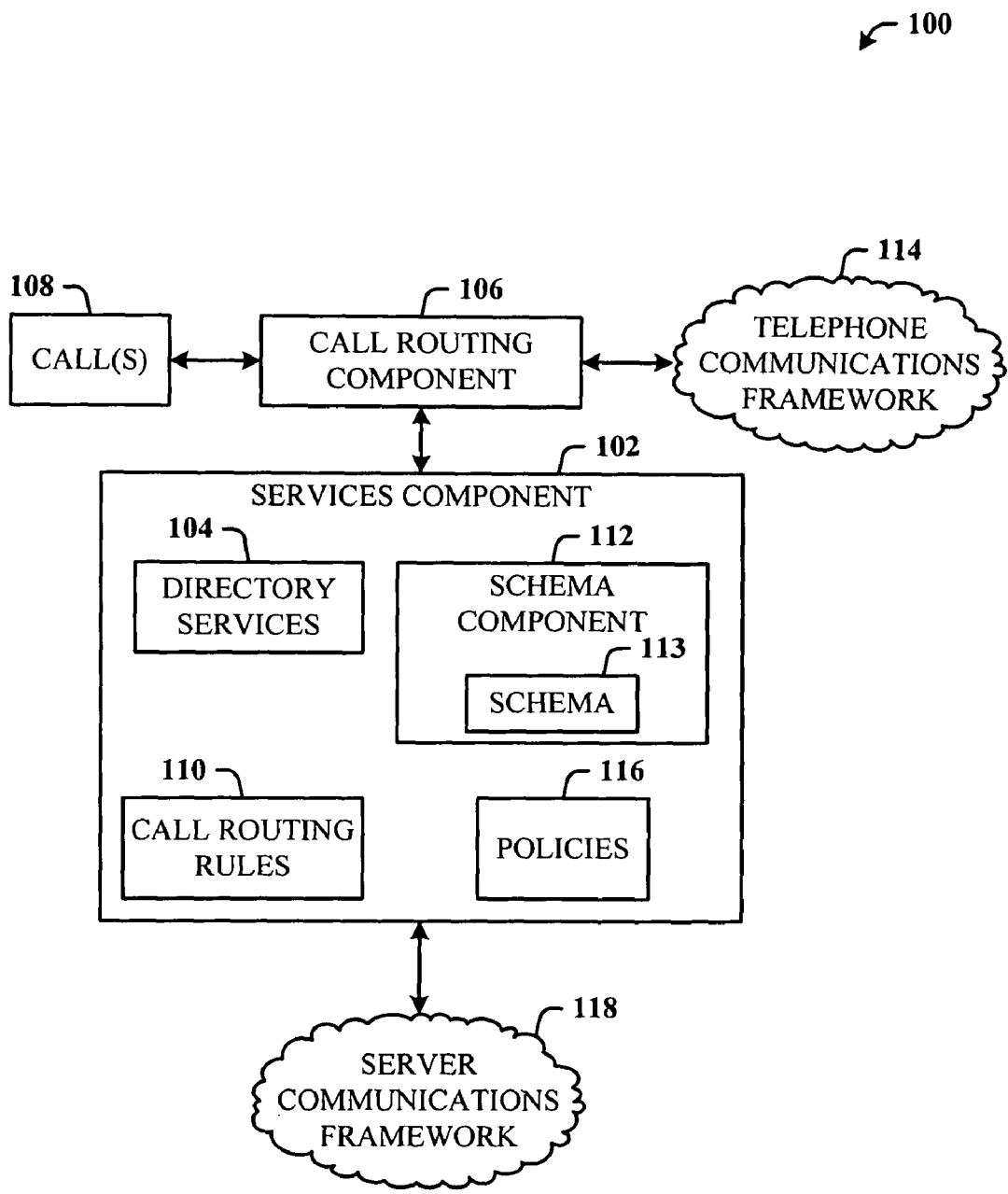
FIG. 1 illustrates a computer-implemented system that facilitates call management.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture provides a mechanism for efficiently handling telephone management hardware and/or software at multiple telephone systems (e.g., associated with an enterprise system). This is accomplished by implementation of a directory services schema for call management. Directory services allow a user to find any object (e.g., user, system, resource and service) based on one or more of the object attributes by querying the directory to obtain a list of objects that match the attributes. In one implementation, the directory service employs rules defined by a schema. The schema is a single, modifiable, and extensible schema. The schema is a set of objects and rules that provide the structure requirements for directory services objects. The schema can be modified to implement new types of objects or object properties. An example object can be a network gateway with attributes (or properties) that identify its name, location, ports, and other desired information.

The schema is utilized to differentiate object classes (e.g., user and gateway) from each other. Schema information allows an administrator to add attributes to object classes, and have the classes distributed across the network to other servers without restarting any domain controllers (servers at other locations running the directory services). Each object is uniquely identified with an LDAP (lightweight directory access protocol) attribute called a distinguished name (DN).

By leveraging a distributed directory system, a routing rule (e.g., a least cost routing (LCR) rule) can be created once and applied uniformly to all systems affected. LCR rules, for example, enable businesses to intelligently routes calls via the most cost effective path without impacting business processes. For example, the voice services platform can be implemented to use any type of media and technology available to route calls based on priorities related to, for example, user profile, tariff, network availability, line quality, geographic variances, message size, and signal quality.

Utilization of the disclosed architecture means that no longer is the administrator required to specify routing rules on each individual telephone system (e.g., a PBX-private branch exchange). Moreover, rather than using database tables consisting of fields and records to represent the rules, the rules are represented as instances of a class. By using a usage table that administrators can define, this allows administrators the flexibility to create phone routes for various scenarios. For example, when an administrator removes a gateway or deletes a usage policy from the system, using the DN, the phone routing rules can be automatically updated. In other words, a rule changed at one server (running the directory service) is automatically propagated (or replicated) to the other directory services servers on the network. Thus, the integrity of the phone routes is maintaining preventing calls from going to a "dead" gateway.

Referring initially to the drawings, FIG. 1 illustrates a computer-implemented system 100 that facilitates call management. The system 100 includes a services component 102 for providing distributed directory services 104, and a call routing component 106 that routes telephone calls 108 (e.g., land-line call, cellular call, VoIP call, . . . ) according to call routing rules 110. The rules 110 are defined by a directory services schema 113, which can be generated using a schema component 112. The rules 110 are processed to cause the routing component 106 to route the calls 108 over a telephone communications framework 114 (e.g., PSTN-public switched telephone network, cellular network). In yet another example, the call routing component 106 routes the calls 108 over the telephone communications framework 114, which includes interfacing to an IP network (e.g., the Internet) for VoIP (voice-over-IP) communications.

The call routing rules 110 can include, for example, least-cost-routing (LCR) processing such that an originating call (e.g., of the enterprise) is processed into an outgoing call that is routed over a better route, which can be VoIP. Other rules can include, but are not limited to, the time of day, day of week, quality of service requested, etc. Accordingly, one or more of the rules 110 will identify gateways (not shown) for call routing (e.g., that provide the interface between an IP network and a telephone network such as the PSTN and a local PSTN infrastructure).

The rules 110 are defined in the schema 113 by objects, object classes, and instances of classes, for example. Additionally, one or more usage policies 116 can be created for each user or group of users. In one implementation, the rules 110 and policies 116 can be processed in combination to determine how a call should be routed (e.g., VoIP versus PSTN), and whether the call should be routed at all. For example, if the usage policy indicates that the user is not allowed for VoIP call routing, the user's call will not be routed for VoIP, even though the network may be capable of handling processing the call for VoIP at that time. In an alternative implementation, the rules 110 are processed for call routing independent of the policies 116.

Given that directory services are employed, the services component 102 (e.g., a directory services server) interfaces to other compatible directory services components over a server communications framework 118 (e.g., an IP framework such as the Internet). Moreover, it is to be understood that when VoIP is employed, aspects of the telephone communications framework 114 can interface directly to the server communications network 118 to facilitate completing the call. Furthermore, cable and/or satellite television systems can also be employed for call communications via the telephone and server communications frameworks (114 and 118).

In one exemplary implementation, although not a requirement, the system 100 employs a distributed directory system such as Active Directory™, a product by Microsoft Corporation. Active Directory is an advanced hierarchical directory service that is LDAP compliant and built on the Internet's domain name system (DNS). For example, workgroups can be assigned domain names like websites, and any LDAP-compliant client can gain access to it. Additionally, the directory service can function as a heterogeneous enterprise network and encompass other third-party directory services.

The disclosed architecture can make use of DNs to maintain dependencies between policy, usage definition, gateways and routes synchronized automatically. For example, if the administrator decommissions a network device (e.g., a VoIP gateway) from the system, this information automatically propagates to the routing rules. A rule that references this network entity (e.g., a gateway) can then be updated to reflect its status. If the administrator renames an existing usage definition, the rules and policies automatically reference the new usage name, thus the integrity of the system (e.g., VoIP) is maintained without any additional effort from the administrator. The rules can be represented by classes and instances of classes.

Hardware can drop offline and come back online. Gateways, for example, can be referenced from routes or not referenced from routes. However, because a gateway is referenced by a route does not mean it is online. Accordingly, logic can be provided to handle static device states (whether the device is online or offline), as well as dynamic changes (active changes in state of a working device). The static state can include how the device is represented in directory services. The dynamic state is the realtime feedback received from a working device based requests to the device do certain things.

In VoIP systems, for example, since there can be multiple servers involved in building this system, every server should be configured with the same routing logic uniformly. By leveraging the disclosed directory services to publish the phone route rules, every server subscribed to this service automatically gets updates to these rules (which can be made by the administrator). By using a configurable usage table, the administrator has the flexibility to configure routing rules that can meet their business needs without overly complicating the design logic of the system.

Figure 2:
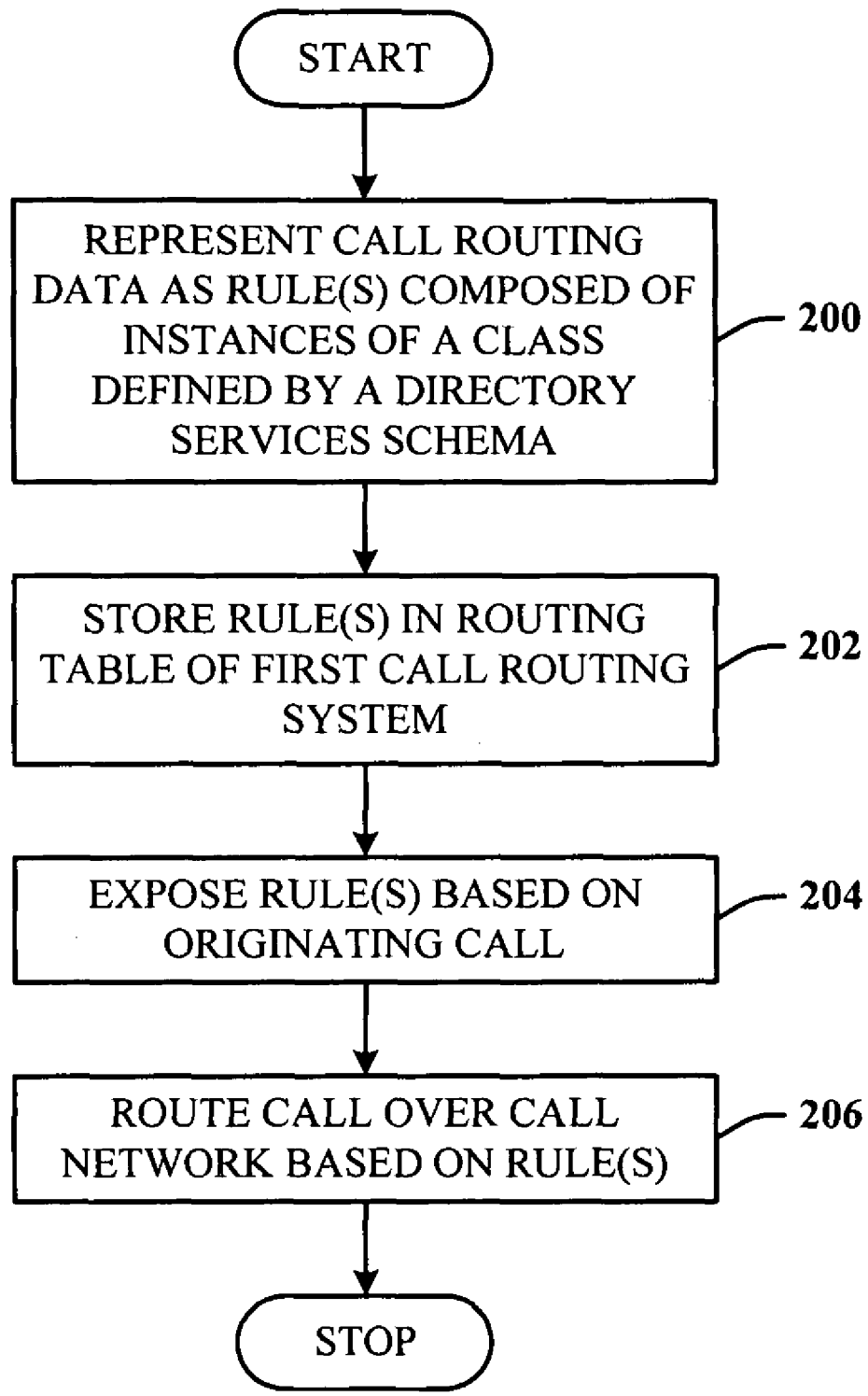
FIG. 2 illustrates a methodology of managing calls in accordance with the disclosed architecture.

FIG. 2 illustrates a methodology of managing calls in accordance with the disclosed architecture. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, telephone routing data of a call routing system is represented as one or more rules composed of instances of a class. At 202, the one or more rules are stored in a call routing table of the call routing system. At 204, the one or more rules are exposed for processing based on an originating call. At 206, the call is routed over a call network based on the routing data written into the one or more rules.

Figure 3:
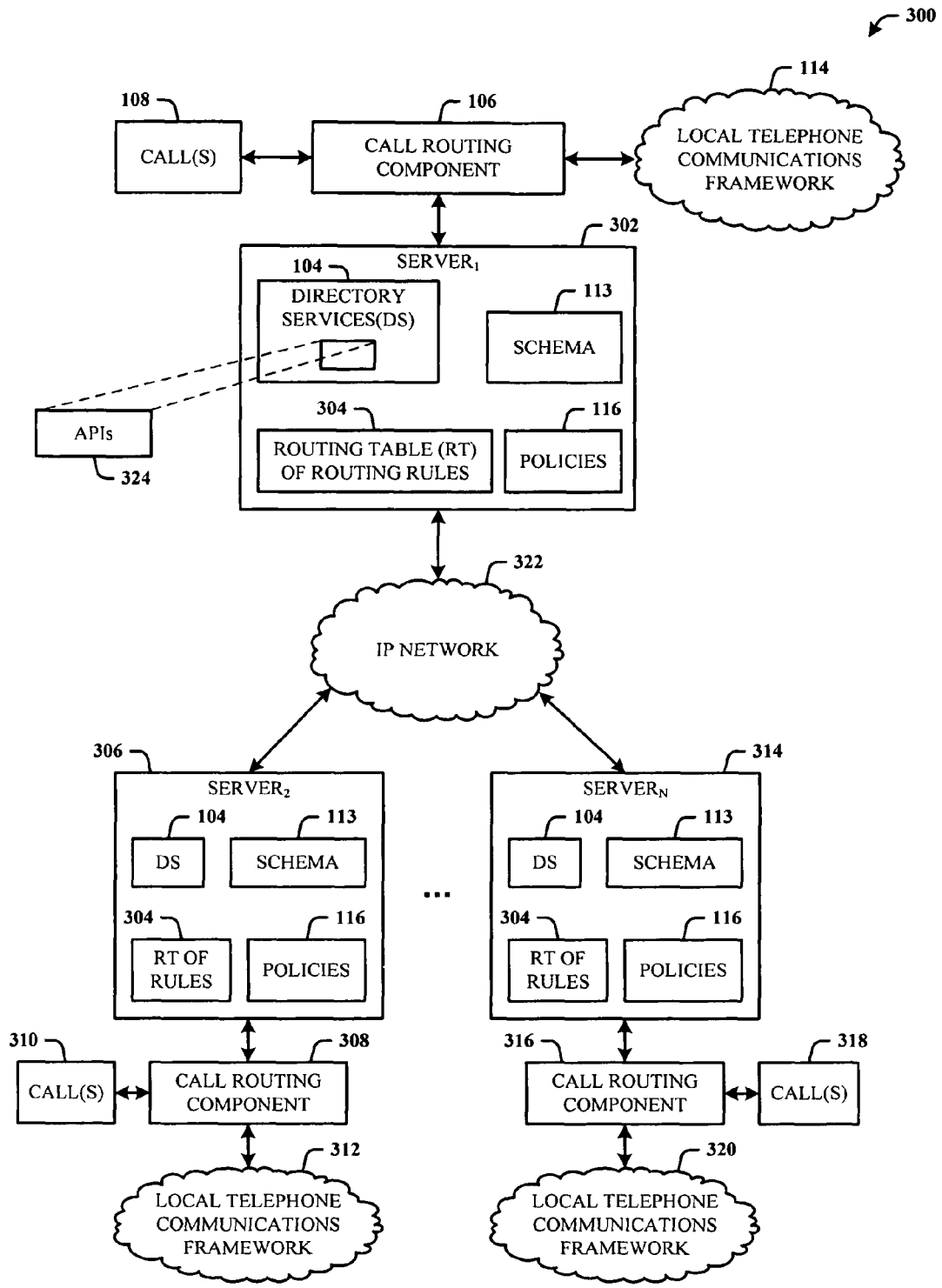
FIG. 3 illustrates an enterprise call management system for managing calls.

Referring now to FIG. 3, there is illustrated an enterprise call management system 300 for managing calls. In this particular implementation, the system 300 includes a plurality of servers (denoted $SERVER_1$, $SERVER_2$, ..., $SERVER_N$, where N is a positive integer) configured for directory services. For example, a first server 302 is associated with the call routing component 106 (for processing call(s) 108) and the local telephone communications framework 114. The first server 302 includes the directory services 104, a routing table 304 that stores at least the routing rules, the schema 113, and the usage policies 116. Similarly, a second server 306 is associated with a call routing component 308 (for processing calls 310) and a local telephone communications framework 312. The second server 306 includes the directory services 104, the routing table 304 that stores the routing rules, the schema 113 (optionally), and the usage policies 116. Finally, an Nth server 314 is associated with a call routing component 316 (for processing calls 318) and a local telephone communications framework 320. The Nth server 314 includes the directory services 104, the routing table 304 that stores the routing rules, the schema 113 (optionally), and the usage policies 116.

As indicated, the servers (302, 306, ..., 314) are provided in support of call routing management for the corporate enterprise. The servers (302, 306, ..., 314) communicate over an IP network 322 (e.g., a LAN, MAN-metropolitan area network, WAN-wide area network, the Internet) such that synchronization of services, rules, rules tables, and policies can be performed. It is to be understood that the illustration of each of the services, rules, policies and schemas at each server (302, 306, ..., 314) is intended to represent that each of these are accessible from any server in accordance with the directory services architecture. For example, an administrator at a corporate headquarters location that includes the first server 302 can develop the schema 113, routing table 304 of rules and usage policies 116 at that location. Thereafter, this information is propagated as part of data synchronization to the other enterprise servers (306, ..., 314) such that if the corporate server 302 fails, the remaining servers (306, ..., 314) can maintain call management based on the most recent data of the routing table and policies, for example. In an alternative implementation, the rules table 304 and/or policies 116 can be stored in the associated routing component 106.

The directory services 104 can include one or more APIs (application program interfaces) 324 that logically represent object classes (e.g., two) and are defined to facilitate management of call routing processes. The APIs 324 will be described in greater detail infra.

Rather than using database tables (consisting of fields and records) to represent the call routing rules in the routing table 304 (e.g., LCR (least cost routing) rules), the rules are represented as instances of a class, in this case, a class object of the directory services. With conventional PBX systems, for example, the routing rules must be specified on each individual PBX system. Contrariwise, by leveraging distributed directory services 104 of the disclosed architecture, a routing rule can be created once and applied uniformly to all other compatible and similarly configured servers for call management.

A distributed directory service (e.g., service 104) facilitates expedient consideration and addressing of network changes or faults. Rules are global to all enterprise server systems. The rules can be stored in one place, the access to which is provided by all other enterprise systems. For example, when the network administrator removes a gateway or deletes usage data from the system, by using DNs, the phone routing rules can be automatically and/or dynamically updated. Thus, the integrity of the call management system 300 is maintained by preventing calls from being routed to a deactivated or decommissioned gateway. Moreover, by using a usage table that administrators can define, this allows the administrator the flexible capability of creating phone routes (or routing rules) for various alternative routing connections.

In order for a phone call to reach its destination, the call should be routed to the most appropriate network entity (e.g., gateway). The logic for determining how best to route the call (e.g., by LCR) can be defined in the rules routing table 304, which can be manually configured by the administrator. Rather than exposing these rules as database records, the rules are exposed as instances of one or more classes.

In one implementation, a rule includes a range and/or pattern of destination phone numbers. When a phone call is placed, the service (or server) 302 determines which rule(s) match the destination number. If there is more than one match, the server 302 determines which rule(s) the caller is allowed to use based on a usage field of one of the policies 116. In another implementation, policy processing can be according to pattern matches on policy information. If the user's policy matches the usages assigned to a phone routing rule, the call is directed over that route.

It is further within contemplation of the subject architecture that routing and/or policy processing includes rules that employ Boolean logic. For example, a rule can be developed that "This policy will only be processed between the hours of 5 AM-5 PM each day." Another example, combines routing rules and policies: "User A is routed over Route F on Thursday, between the hours of 6 PM and midnight." Put another way, logically, execute "Rule F AND Policy C". Logic can be employed to consider the identity of the user, user location, time of day, QoS (quality of service), user preferences, priorities, cost versus benefit analysis of system properties, and so on. Such a capability facilitates a more intuitive implementation whereby vendors and customers can customize their own system configurations, for example.

Another implementation facilitates call blocking. Thus, a policy can be developed that blocks access to certain phone numbers (e.g., 1-900 number). Another example routes only certain types of information over a given route. For example, if, as learned and reasoned by analysis, one route proves over time to be more reliable than another, and the information being communicated (e.g., chief executive) is deemed more important than other information, a policy can be employed that makes this connection available for this user. These are only but a few examples of the flexibility provided by directory services schema development and implementation.

FIG. 4 illustrates a table of one exemplary set of APIs that can be employed in the directory service. The APIs (e.g., WMI (windows management instrumentation)) are defined to facilitate management of the disclosed call management system. These APIs logically represent two classes. For example, an instance of the MSFT_SIPPhoneRouteSetting class represents a routing rule as an object oriented class. In another example, an instance of the MSFT_SIPPhoneRouteUsageData class represents a usage attribute as an object oriented class.

A first property (identified with a setting number of C1) is a routing rule instance ID (e.g., MSFT_SIPPhoneRouteSetting::InstanceID). Neither valid values nor a default value are stipulated. With respect to being exposed to the user via the user interface, in one implementation, it is never available. In an alternative scenario, the property is available to be exposed. A second property (identified with a setting number of C2) is a phone number range or pattern provided to one or more gateways (e.g., a SIP-session initiation protocol gateway) routing rule instance ID (e.g., MSFT_SIPPhoneRouteSetting::TargetPhoneNumbers). In one example, valid values can include Unicode strings to 1024 characters. A default value of this property is null. With respect to being exposed to the user via the user interface, in one implementation, the property is available to be exposed. The target phone numbers can be chained together delimited by the regular expression or operator "|" as a single regular expression.

A third property (identified with a setting number of C3) is a list of gateways to route (e.g., MSFT_SIPPhoneRouteSetting::GatewayList). In one example, valid values can include a Unicode string array of a fully qualified domain name and port information (FQDN:PORT) up to 256 characters. A default value of this property is null. With respect to being exposed to the user via the user interface, the property is available to be exposed.

A fourth property (identified with a setting number of C4) is phone route usage data (e.g., MSFT_SIPPhoneRouteSetting::PhoneUsage). In one example, valid values can include an array MSFT_SIPPhoneRouteUsageDatsa::UsageDNs). With respect to being exposed to the user via the user interface, the property is available to be exposed.

A fifth property (identified with a setting number of C5) is phone route description (e.g., MSFT_SIPPhoneRouteSetting::Description). In one example, valid values can include a Unicode string up to 1024 characters. A default value of this property is null. With respect to being exposed to the user via the user interface, the property is available to be exposed.

A sixth property (identified with a setting number of C6) is the phone route friendly name (e.g., MSFT_SIPPhoneRouteSetting::Name). In one example, valid values can include a Unicode string up to 1024 characters. A default value of this property is null. With respect to being exposed to the user via the user interface, in one implementation, it is never available. In an alternative scenario, the property is available to be exposed. This value should be unique.

A seventh property (identified with a setting number of C7) is a phone route setting translation (e.g., MSFT_SIPPhoneRouteSetting::Translation) for translating the matched phone number to a different number for carrier code insertion, translation to a dialable format, etc. In one example, valid values can include a Unicode string up to 1024 characters. With respect to being exposed to the user via the user interface, in one implementation, it can always be available.

An eighth property (identified with a setting number of C8) is the phone usage instance ID (e.g., MSFT_SIPPhoneRouteUsageData::InstanceID). With respect to being exposed to the user via the user interface, in one implementation, it is never available. In an alternative scenario, the property is available to be exposed.

A ninth property (identified with a setting number of C9) is the distinguished name of an object (e.g., MSFT_SIPPhoneRouteUsageData::UsageDN). The valid values include the distinguished names. With respect to being exposed to the user via the user interface, in one implementation, it is never available. In an alternative scenario, the property is available to be exposed.

A tenth property (identified with a setting number of C10) is a usage attribute name (e.g., MSFT_SIPPhoneRouteUsageData::Attribute). In one example, valid values can include a Unicode string up to 256 characters. A default value of this property is null. With respect to being exposed to the user via the user interface, the property is available to be exposed.

An eleventh property (identified with a setting number of C11) is a usage description (e.g., MSFT_SIPPhoneRouteUsageData::Description). In one example, valid values can include a Unicode string up to 1024 characters. A default value of this property is null. With respect to being exposed to the user via the user interface, the property is available to be exposed.

A twelfth property (identified with a setting number of C12) is usage attachment (e.g., MSFT_SIPPhoneRouteUsageData::Attach) for attaching custom business logic to usages (e.g., time of day, quality of service, . . . ). In one example, valid values can include a Unicode string up to 1024 characters. A default value of this property is null. With respect to being exposed to the user via the user interface, the property is available to be exposed.

Note that the table is only one example of the types of properties that can be defined, and is not an exhaustive list. Additionally, note that the valid values can also be developed for a case sensitive format.

FIG. 5 illustrates an exemplary attribute table for defining usage attributes using short user-friendly name strings. Here, three cities (City1, City2, and City3) of the corporate enterprise are defined, along with associated full time employee (FTE) and part-time or temporary employee attribute descriptions. Additionally, the local and long-distance costs are represented as one or more dollar signs "$" to indicate relative costs associated therewith.

Note that in one implementation, one or more usage attributes are ordered and defined to form a policy that is assigned to a user category, which can be a single user or multiple users. In another implementation, each user can be directly assigned an ordered set of usage attributes (where multiple attributes are used). It is to be understood that either implementation can be employed in the disclosed directory services architecture at the discretion of the administrator.

FIG. 6 illustrates an exemplary users table for associating one or more users with the policies of the usage attributes defined in FIG. 5. The table includes two columns: a users column that lists categories of users, which can be a single user and/or group of users, and a policy column that lists a policy as a single usage attribute or multiple ordered usage attributes. A single attribute can define a policy, and multiple ordered attributes can also define a policy. Every user and/or group of users of the environment can be associated with a policy (e.g., MSFT_SIPGlobalUCPolicyData::PhoneUsage) that represents usage allowances as defined according to the one or more usage attributes. A policy contains one or more usage attributes ordered in a predetermined manner. Thus, an administrator can configure a user policy to facilitate call routing in the desired order.

For example, CITY1 domain users in the CITY1\DOMAIN USERS group are associated with a policy having a single CITY1 usage attribute for routing all calls of users of that group locally to a local carrier of the CITY1. As shown for a second group, a user in the group of users of a second city CITY2, the CITY2\DOMAIN USERS group, can be associated with a policy having more than one usage attribute ordered (e.g., left-to-right) for priority of execution. For example, a first usage attribute (denoted LOCAL) of the policy operates to first attempt call routing locally within the city (CITY2) using the destination phone number. Should the call not be routed locally according to the LOCAL usage attribute, a second lower-priority usage attribute (denoted LONG-DISTANCE) of the policy will be executed to route the call as long-distance. Still further, should the call not be routed long distance according to the second usage attribute, an even lower-priority third usage attribute (denoted CITY2) of the policy is executed to route the call to a route identified as CITY2 (effectively a default route, local to the caller). Thus, multiple usage attributes can be prioritized for execution or processing in a user policy.

Similarly, all executives in the second city (denoted CITY2) can be grouped in an EXECUTIVES group, and assigned to a policy of multiple prioritized usage attributes: LOCAL, LONG-DISTANCE, CITY2, and CITY3. Other single and multiple usage attribute policies can be assigned for other cities, as shown.

FIG. 7 illustrates an exemplary routing table. In this example, the table includes columns for the route, phone number pattern (or range), usage attributes, and next hops. For example, a first route (CITY1-ALL) is associated with a first city (CITY1) using a wild card character (*) for performing a matching operation on all string characters of the destination phone number. The usage attribute employed CITY1, as defined in the attribute table of FIG. 5. The next hop information for gateways (City1-gw.corp.123.com:Port) defines the address and port of the next gateway device, which can be reached through an outgoing port (PORT) of the current router or gateway. Other examples are shown.

In operation, a destination phone of a caller is received and processed against the patterns (or ranges) listed in the routing table to find one or more matching routing rules. Of the matched rule(s), next, the usage attribute(s) of the matched rule(s) are compared with the usage attributes assigned to policy of the user or group of users of which the caller is a member. For example, if the caller is defined as a member of the CITY1\DOMAIN USERS group, the matched rule(s) usage attribute(s) will be compared to the single usage attribute CITY1 of the policy associated with that group. As can be seen, if the caller destination phone number matches the first rule (CITY1-ALL) of the routing table, the usage attribute of that rule matches the usage attribute of the policy for the group of which the caller is a member. Thus, there is a match in both destination number and user policy. Accordingly, the call will be routed to the gateway listed in the NEXT HOPS column of that routing rule. Thus, the best route can be selected as defined by the administrator. The call is then routed over the communications framework (e.g., the PSTN-public switch telephone network, cellular network, VoIP (voice over IP) network, . . . ) to a call destination system.

In another example, consider the same caller making a call using a destination phone number that matches the number pattern for the second rule labeled as CITY2-LOCAL. Since the caller is a member of the CITY1\DOMAIN USERS group having a policy that only allows calls to be made according to the CITY1 usage attribute, there is not a match between the rule usage attributes and the caller policy attribute. Accordingly, the caller is prevented from making the call.

Figure 8:
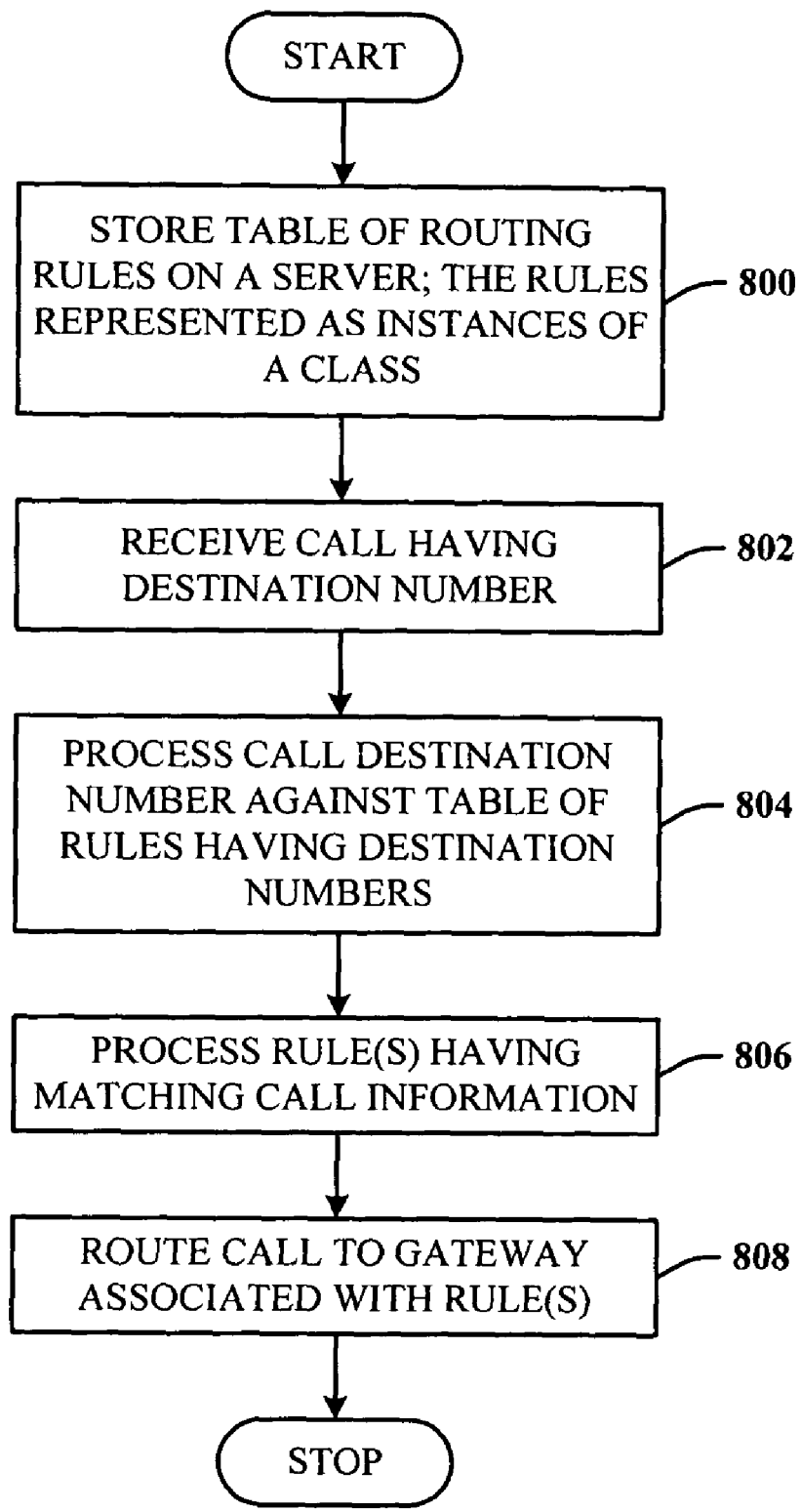
FIG. 8 illustrates a methodology of call processing and routing using the routing rules.

FIG. 8 illustrates a methodology of call processing and routing using the routing rules. At 800, a table of routing rules is stored on a server. As indicated supra, the rules are defined in a directory services schema as one or more instances of one or more classes. At 802, a call is received having a destination phone number. At 804, the call destination number is processed against the table of rules to find a rule having the matching destination number (as found in the range or pattern of numbers). At 806, the matching rule(s) having the matching destination number are processed. At 808, based on the matching rule, the call is routed to the corresponding gateway (or call network interface equipment).

Figure 9:
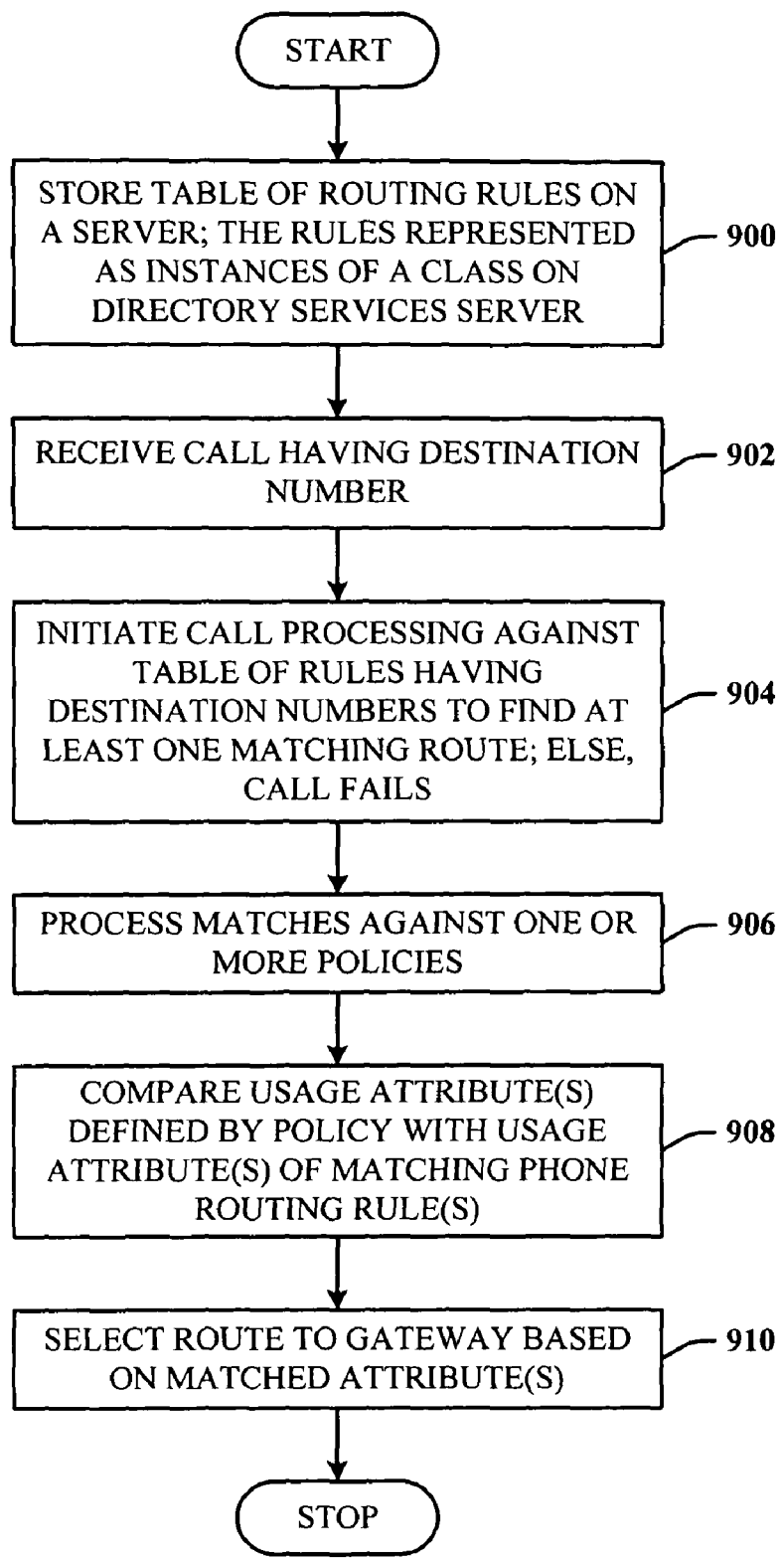
FIG. 9 illustrates an alternative methodology of call processing and routing using the routing rules in combination with a user policy.

Referring now to FIG. 9, there is illustrated an alternative methodology of call processing and routing using the routing rules in combination with a user usage policy. At 900, the routing rules are stored in a routing table on a directory services server. The rules are composed of classes and instances of those classes. At 902, a call is received for processing having an associated call destination number. At 904, the call processing is initiated by processing the call against the routing table rules for a matching destination number. If no matches are found, the call fails. At 906, matches are then processed against one or more policies associated with that user (or the call group of which the user is a member). At 908, usage allowances defined by the one or more policies of the group are compared with usage attribute(s) of the matched phone routing rule(s). At 910, the resulting route (or routes) is selected and processed to route the call to the corresponding call gateway system based on a match between the attribute(s) of the rule and the policy.

It is within contemplation of the subject architecture that multiple rule and policy matches can occur, resulting in the system making determinations as to which route over which to route the call. For example, in one implementation where there is a phone number match and a usage attribute match, the route selected can be according to alphabetized route names in which the selected route is the first route in alphabetical order. Another solution to this problem can be to analyze the data being utilized in the matching process, and select the route based on the data that is more specific. This can be accomplished using an expression parser, for example, that parses the desired information for analysis and determination processing.

It is also to be understood that multiple gateways can be employed for a route. Thus, selection of a gateway can be according to any number of methodologies such as round robin, for example. In another multiple gateway selection implementation, weighting values can be applied to the gateways. For example, one gateway can support ten calls while a larger capacity supports forty calls simultaneously. Thus, the larger capacity gateway is given a weighting of ⅘ such that more calls will be routed to the larger gateway than the smaller capacity gateway (which is weighted at ⅕).

Figure 10:
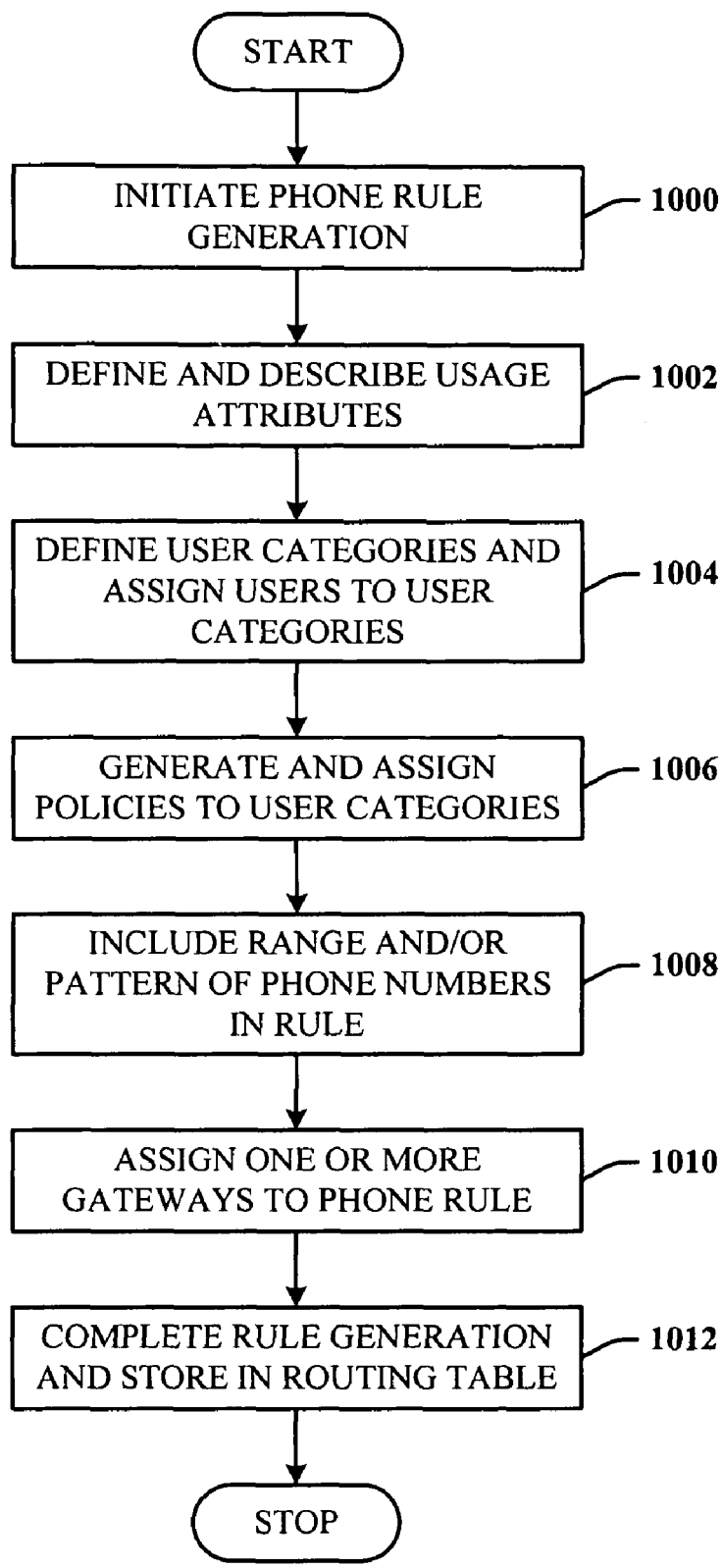
FIG. 10 illustrates a methodology of employing call destination number ranges and/or patterns in the routing rules.

FIG. 10 illustrates a methodology of employing call destination number ranges and/or patterns in the routing rules. At 1000, a phone rule generation process is initiated using a directory services schema for generating routing rules as one or more instances of a class based on one or more usage attributes. At 1002, usage attributes are defined and described for various types of usages. At 1004, users categories are defined, and corporate users are assigned to the user categories. At 1006, user policies are generated using one or more of the usage attributes and assigned to each user category (user and/or group of users). At 1008, included in the rule is a range and/or pattern of phone numbers. At 1010, one or more gateways are assigned to the phone rule. At 1012, rule generation is then complete, and the rule is stored in the routing table.

Figure 11:
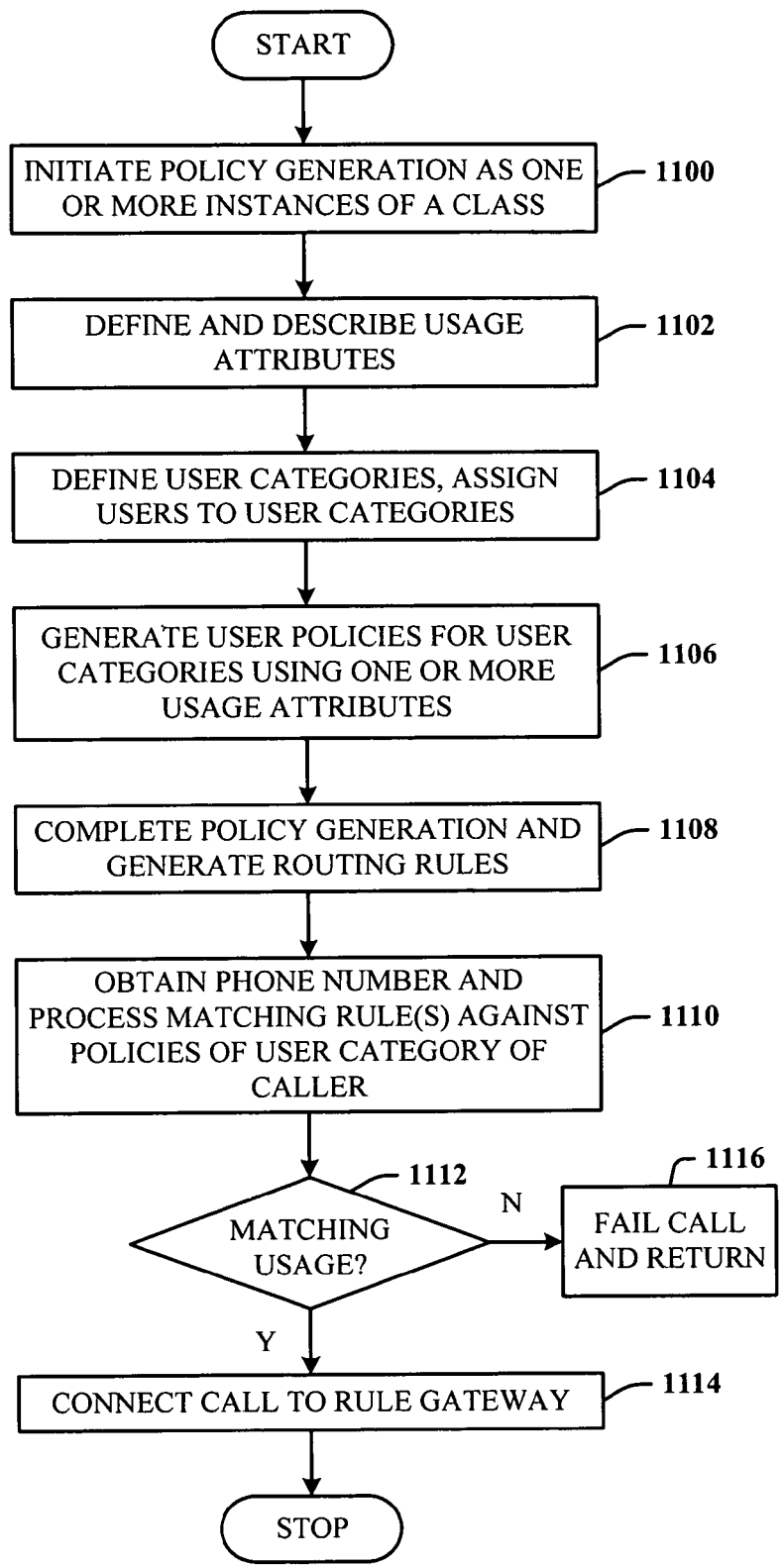
FIG. 11 illustrates a methodology of utilizing policies for call routing.

FIG. 11 illustrates a methodology of utilizing policies for call routing. At 1100, a phone rule generation process is initiated that uses a directory services schema for generating routing rules as one or more instances of a class based on one or more usage attributes. At 1102, usage attributes are defined and described for various types of usages. At 1104, user categories are defined, users are assigned to the user categories. At 1106, user policies are generated using one or more of the usage attributes, and one or more policies are assigned to each user category (user and/or group of users). At 1108, the user policy generation process is completed and routing rules are generated that include a route name, route description, one or more usages defined by usage attributes, one or more gateways, and one or more target (or destination) phone numbers. At 1110, a phone number is received and processed against the routing rules to find one or more matching rule(s). The matching rule(s) are then processed against the policy of user category of which the caller is a member. At 1112, if a match in the usage attributes is obtained, flow is to 1114, where the call is connected to the gateway of the rule. If there is no matching usage attribute, flow is from 1112 to 1116, where the call is failed, and flow returns to process the next phone number.

Figure 12:
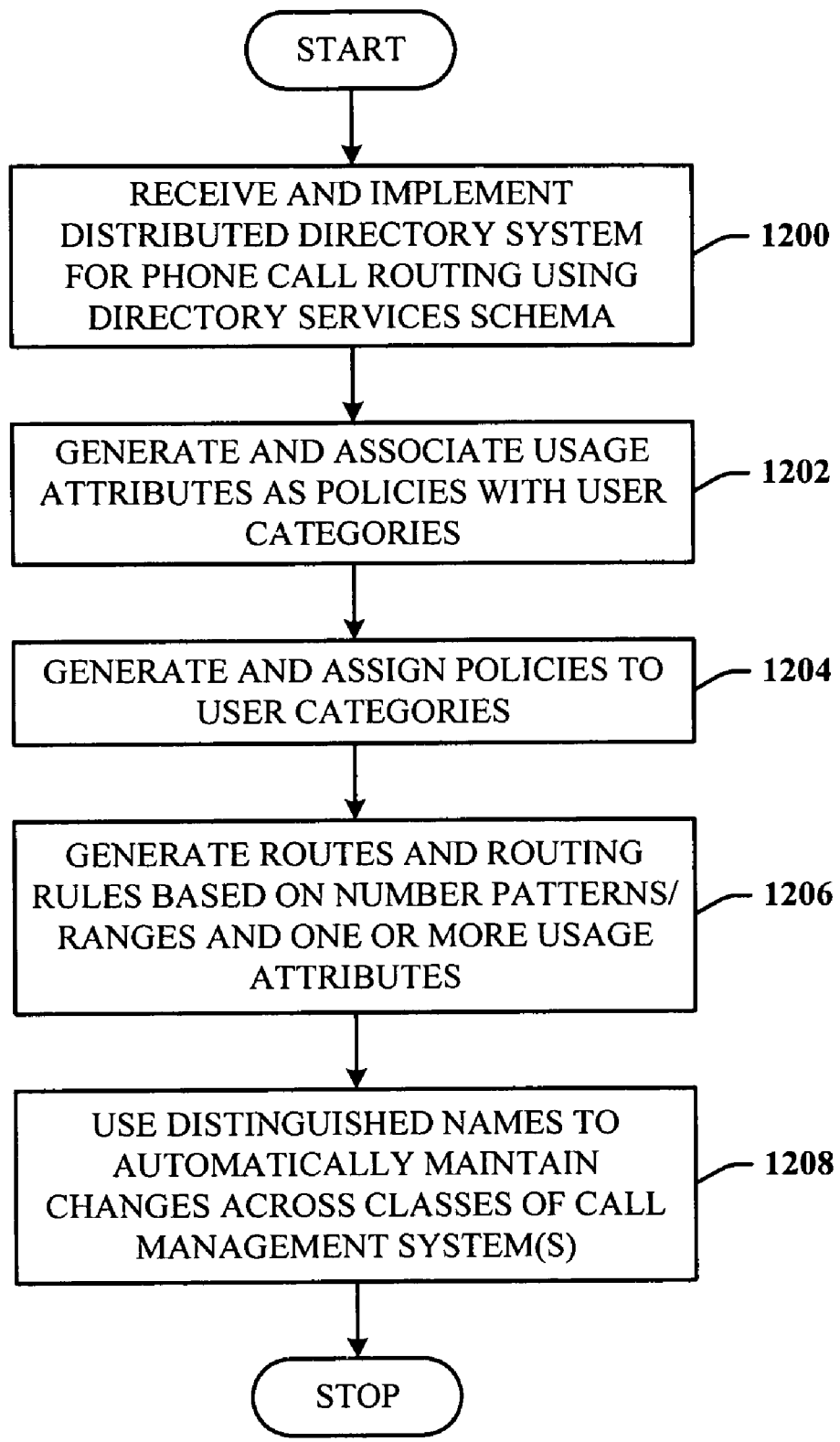
FIG. 12 illustrates a methodology of updating class changes in a directory services call management system.

FIG. 12 illustrates a methodology of updating class changes in a directory services call management system. At 1200, a distributed directory phone system (or server) is received and implemented for phone call routing. At 1202, usage data (attributes) is generated and associated with a user category. At 1204, policies are generated and assigned to each user category. At 1206, routes and routing rules are generated as one or more instances of a class based on phone number patterns/ranges and one or more usage attributes. At 1208, DNs are employed to automatically maintain changes across classes of call management systems that interface to the legacy call system.

For example, a large company dispersed across different geographic locations can have implemented several call management systems of similar design and capability or even of different designs, models, etc., that process calls for that company. At each location, a directory service described herein that employs rules (as instances of classes) can be implemented to interface to the local call management system. Thus, the directory service can be distributed across many corporate locations and which intercommunicate to maintain the latest rules, usage allowances, policies, tables, etc. Accordingly, a change in one system entity (e.g., a failed gateway) can be represented as a new rule and propagated to all service locations by using the DNs.

In a more expansive implementation, the disclosed distributed directory service and rules can be implemented in an international setting. Given that each country could have different regulatory requirements, and those regulations are subject to change, complying with the regulations oftentimes can result in complex routing logic that likely requires an update to the software when a new regulation becomes effective. By using a usage table represented by the MSFT_SIPPhoneRouteUsageData class, for example, the administrator can comply with these changes by creating or updating existing routes with new usages.

Figure 13:
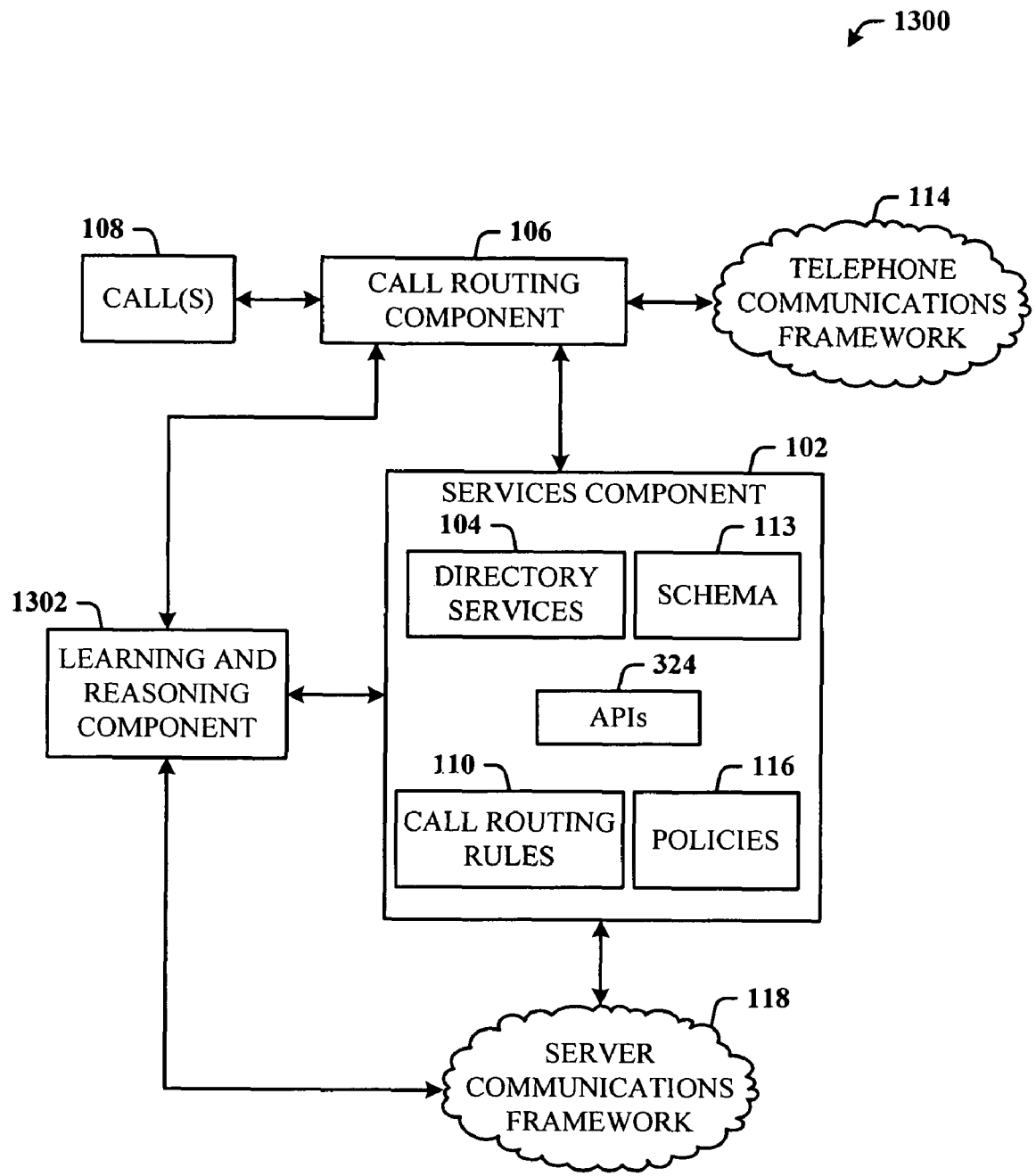
FIG. 13 illustrates an alternative system that employs a machine learning and reasoning component which facilitates automating one or more features.

FIG. 13 illustrates an alternative system 1300 that employs a machine learning and reasoning component (MLR) 1302 which facilitates automating one or more features. The disclosed architecture (e.g., in connection with selection) can employ various MLR-based schemes for carrying out various aspects thereof. For example, a process for determining what rule so select of a plurality of rules can be facilitated via an automatic classifier system and process. Moreover, with directory services 104 distributed over several locations, and each location has an associated table of routing rules 110, the classifier can be employed to determine which location will be selected for regeneration or updating before the other locations, for example.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In this implementation, the MLR component 1302 can interface to the services component 102 to monitor directory services activities by administrators and/or other hardware/software systems. For example, schema activity can be monitored, learned and reasoned about, as well as processing of the routing rules 110, rules table activity, and policies 116.

The MLR component 1302 can also interface to the routing component 106 to monitor and analyze routing processes' related to, for example, use of the APIs 324, changes and updates to the rules table, interaction with the routing rules (instances and classes), activities of the directory services, in general, and overall activities and processes of the routing component 106.

Additionally, the MLR component 1302 can interface to the server communications framework 118 to monitor, learn and reason about framework activity and processes (e.g., hops, bandwidth, network status, other DS server statuses, . . . ), as well as gateway systems.

Figure 14:
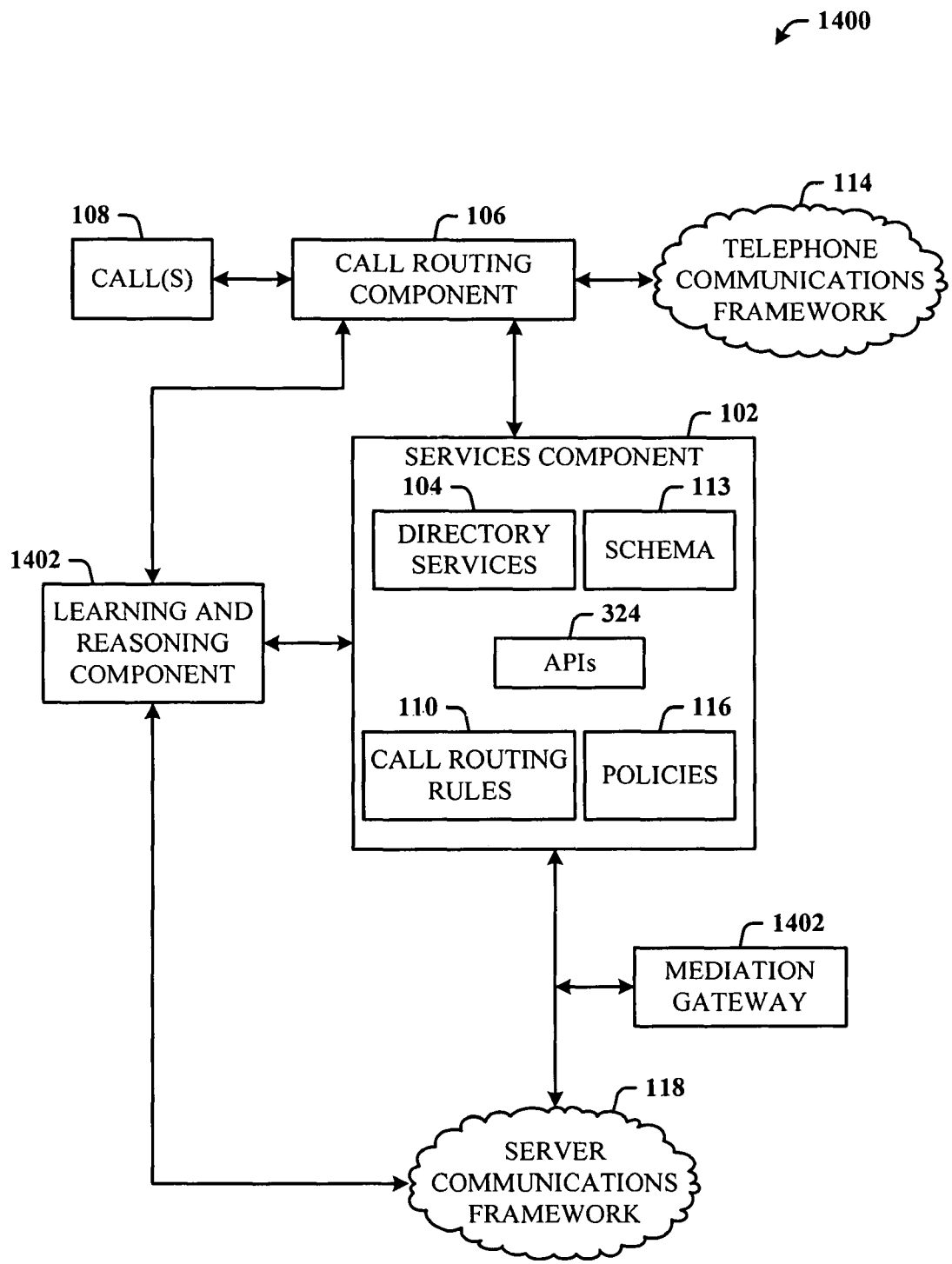
FIG. 14 illustrates an alternative system that employs a mediation gateway for managing gateway communications.

FIG. 14 illustrates an alternative system 1400 that employs a mediation gateway 1402 for managing gateway communications. The mediation gateway is an abstraction that can, for example, offer SIP normalization, secure control and data channels, improved codecs, and value-added components. Presence of the mediation gateway 1402 can allow a customer to leverage their existing hardware investments while upgrading to the disclosed distributed services architecture. The mediation gateway 1402 facilitates control over call routing by allowing routing over one type of gateway (e.g., an approved gateway), but denying routing over another type of gateway (e.g., legacy gateway) the operation of which could be unreliable. Accordingly, the schema 113 can be employed to generate rules for routing management based on the type of gateways employed. Additionally, the MLR component 1302 can be employed to further monitor mediation gateway activities, as well as learn and reason about mediation gateway activities.

FIG. 15 illustrates one exemplary schema for distributed directory services and rules classes/attribute definitions in accordance with the disclosed call routing architecture. As shown, four object are provided: usages, routes, policies, and mediation gateways. The usage object (denoted msRTCSIP-RouteUsages) is associated with a class msRTPSIP-RouteUsage and attribute definitions msRTPSIP-RouteUsageAttribute and msRTPSIP-Description.

The routes object (denoted msRTCSIP-PhoneRoutes) is associated with a class msRTPSIP-PhoneRoute and definitions msRTPSIP-PhoneRouteName, msRTPSIP-TargetPhoneNumbers, msRTPSIP-Gateways, msRTPSIP-PhoneUsage, msRTPSIP-Description, and msRTPSIP-PhoneRouteData.

The policies object (denoted msRTCSIP-Policies) is associated with a class msRTPSIP-GlobalUserPolicy and definitions msRTPSIP-PolicyType, msRTPSIP-PolicyContent, and msRTPSIP-PolicyData.

The gateways object (denoted msRTCSIP-TrustedMediationGateways) is associated with a class msRTPSIP-TrustedMediationGateway and definitions msRTPSIP-TrustedMediationGatewayFQDN, msRTPSIP-TrustedMediationGatewayType, msRTPSIP-TrustedServerVersion, and msRTPSIP-TrustedMediationGatewayData.

In one implementation, the schema is fixed such that local corporate administrators cannot change the schema in anyway. In another implementation, the schema can be customized by the vendor for the purchasing or subscribing company, with limited access and administration by the company. In yet another implementation, administrators of the purchasing or subscribing company are given total access to create their own schema and/or to modify the default schema provided by the vendor.

FIGS. 16-21 show a series of screenshots of a user interface (UI) for interacting with directory services and managing call routing in accordance with the disclosed architecture. While certain ways of displaying information to users are shown and described with respect to certain figures as screenshots, those skilled in the relevant art will recognize that various other alternatives can be employed. The terms "screen,""screenshot", "window", "subwindow" and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 16:
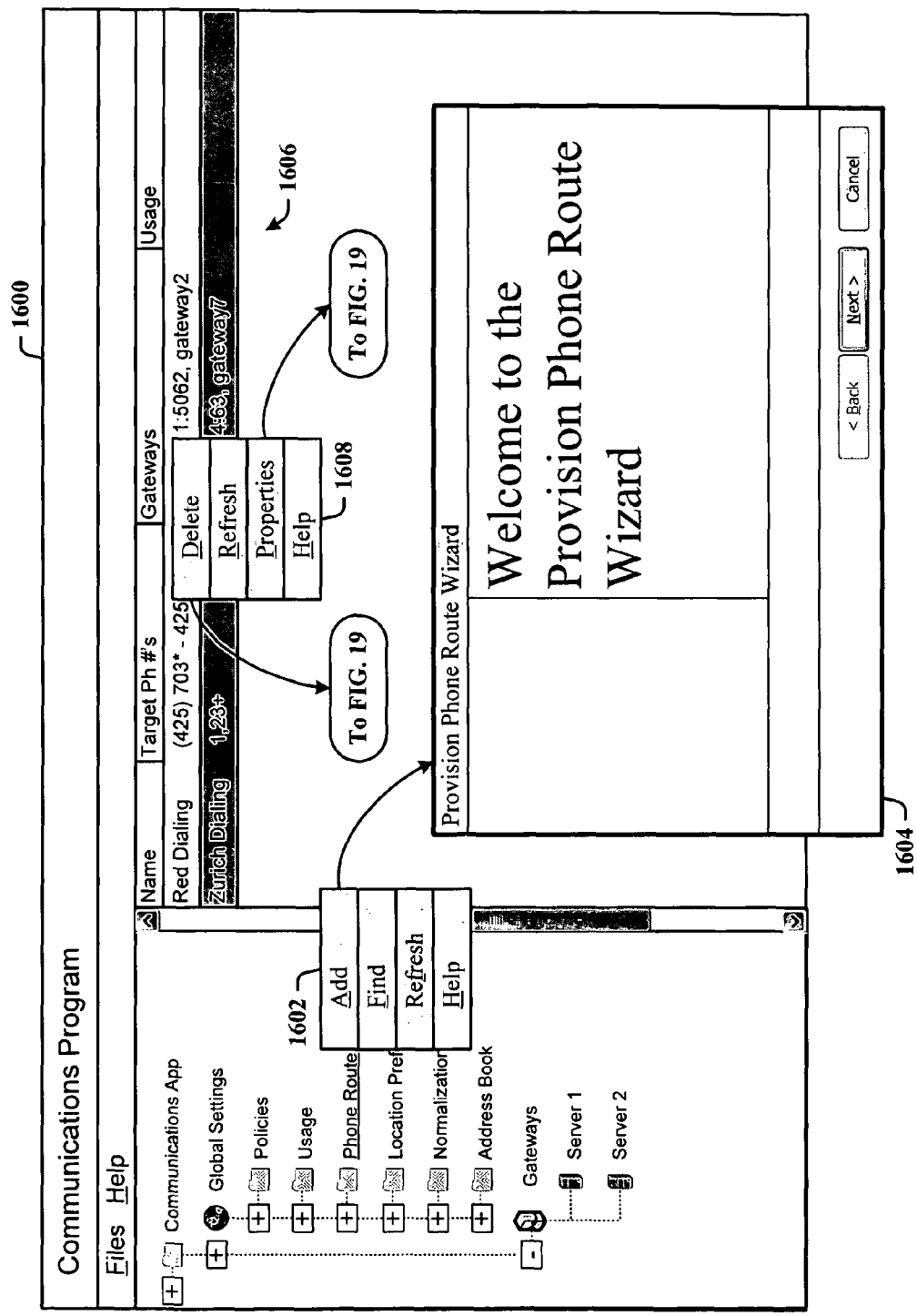
FIG. 16 illustrates an exemplary communications program UI for providing administrator (or user) interaction with various features of the disclosed call directory services.
Figure 19:
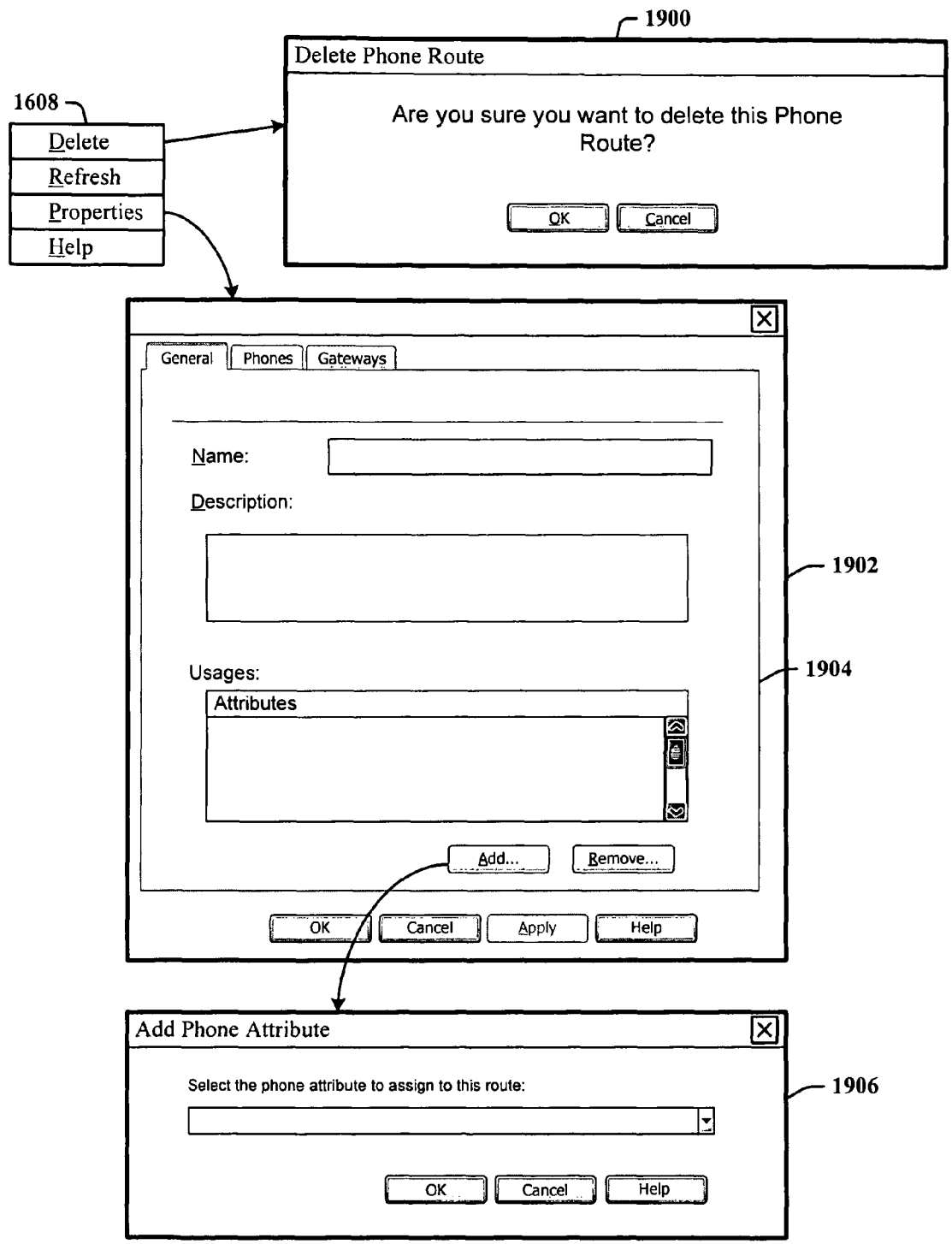
FIG. 19 illustrates a series of windows that facilitate administrator control over entries (or rules).

FIG. 16 illustrates an exemplary communications program UI 1600 for providing administrator (or user) interaction with various features of the disclosed call directory services. For example, the administrator can access a wizard for provisioning call routing by exposing (e.g., by a right-click selection over a Phone Route object presented via the UI) a floating menu 1602 for configuring call routing rules. By selecting an Add selection, a wizard launches and presents a welcome window 1604. The UI 1600 also allows for the management of previously-input entries 1606 as well as for the creation of new phone routing entries. In order to manage existing entries, the can access configuration windows (shown in FIG. 19) by causing another floating menu 1608 to be presented for one of the entries 1606. For example, by highlighting a Zurich dialing entry and right-clicking, the menu 1608 presents selections for managing that entry. The entries 1606 are sortable by any one of the available fields (e.g., name, target Ph#, gateways, . . . ). The description associated with FIG. 19 provides more detail about entry management.

Figure 17:
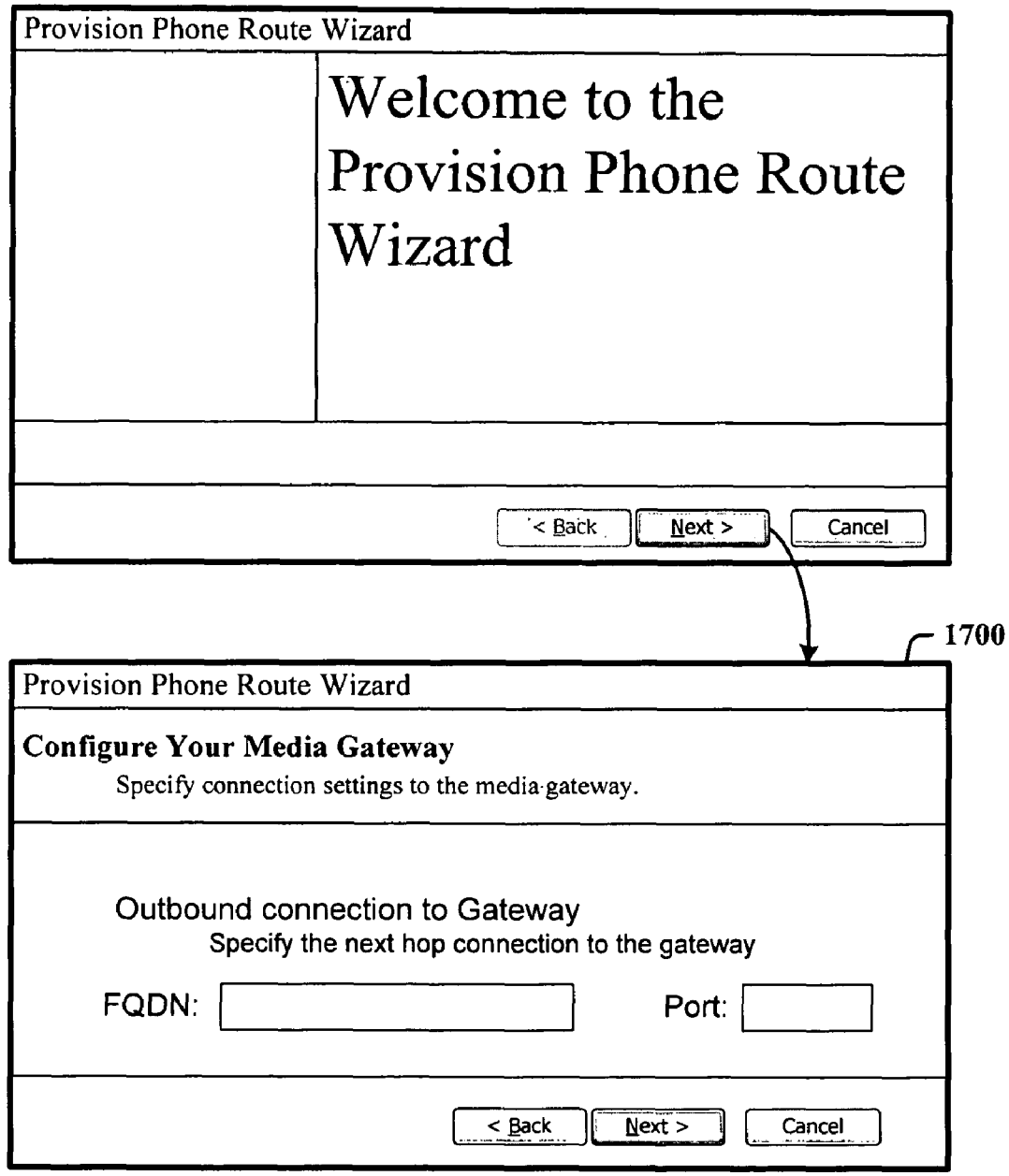
FIG. 17 illustrates an intermediate wizard window for configuring a media gateway.

Turning now to FIG. 17, from the wizard welcome window 1604, an intermediate wizard window 1700 opens that allows the administrator to configure a media gateway. The administrator can configure the outbound connection to the gateway by entering FQDN data and an associated port. A fully qualified domain name is an unambiguous domain name that specifies the node's position in a domain name system (DNS) tree hierarchy. To distinguish an FQDN from a regular domain name, a trailing period is added. An FQDN differs from a regular domain name by its absoluteness.

Figure 18:
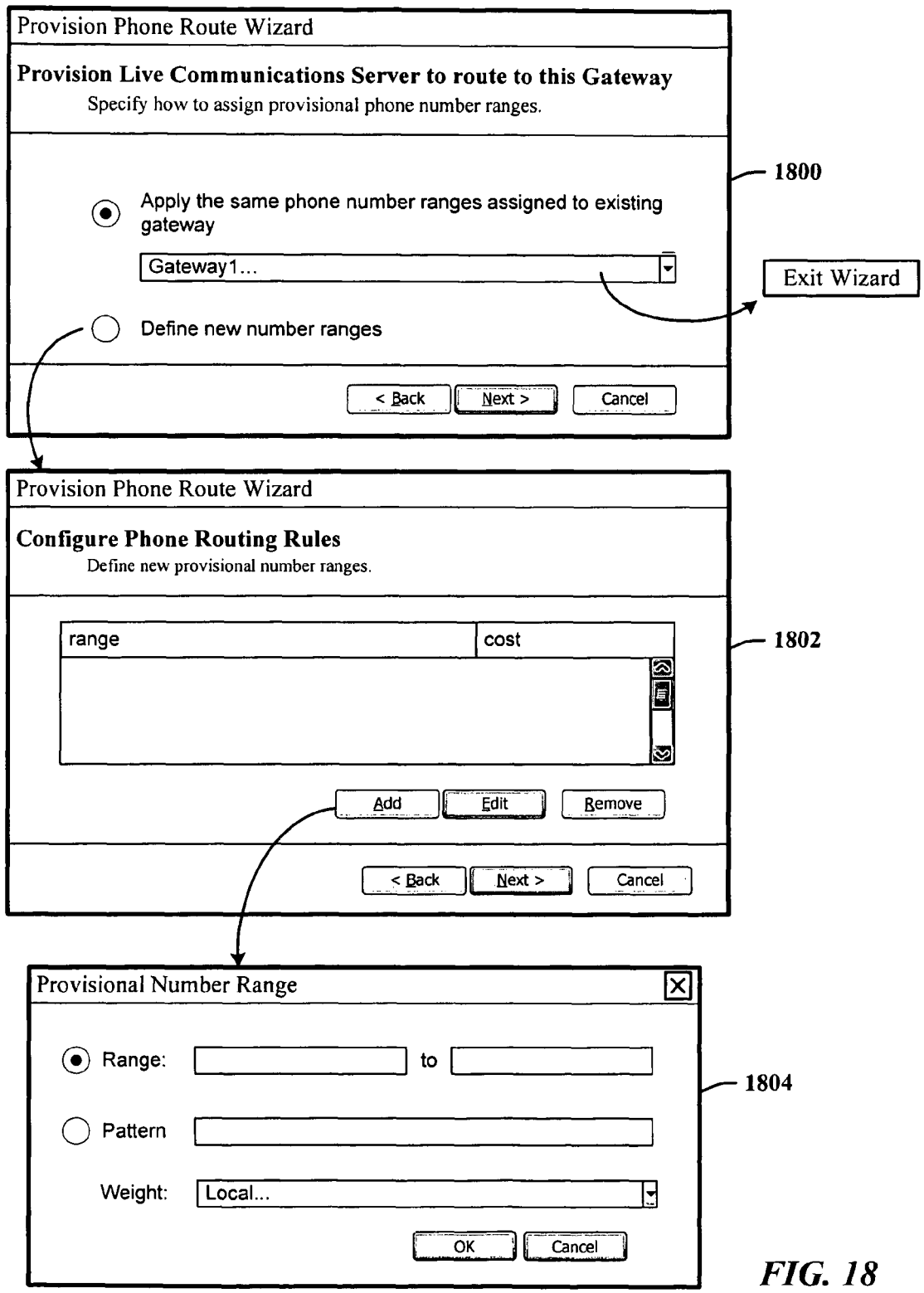
FIG. 18 illustrates additional provisioning windows of the provision wizard.

FIG. 18 illustrates additional provisioning windows of the provision wizard. For example, a second intermediate window 1800 facilitates configuring a communications server to route to the gateway selected in window 1600 of FIG. 16. The administrator can make the top selection which allows selection of a gateway (e.g., Gateway1) for the assignment of phone number ranges and/or patterns. After making the assignment, the wizard exits.

Alternatively, if the administrator makes the bottom selection to define new number ranges, a third intermediate wizard window 1802 opens. By selecting an Add function, a fourth window 1804 opens to allow direct administrator input of range data, pattern data, and weighting data.

FIG. 19 illustrates a series of windows that facilitate administrator control over entries (or rules). When the administrator selects a Delete option from the floating menu 1608, a prompt window 1900 opens that prompts the administrator to confirm the deletion function.

If the administrator selects a Properties option of the menu 1608, a window 1902 opens that allows tab selection (e.g., General, Phones, and Gateways) for creation of a new routing entry. The General tab exposes an input and/or selection subwindow 1904 that includes fields for entry of a name, description, and usages information. Note that the administrator can specify at least one or more attributes when creating a phone route entry. By selecting an Add button of subwindow 1904, a phone attribute window 1906 is presented that allows the administrator to select one or more phone attributes to specify for the phone route entry. The attributes can be those defined in the usage table.

Figure 20:
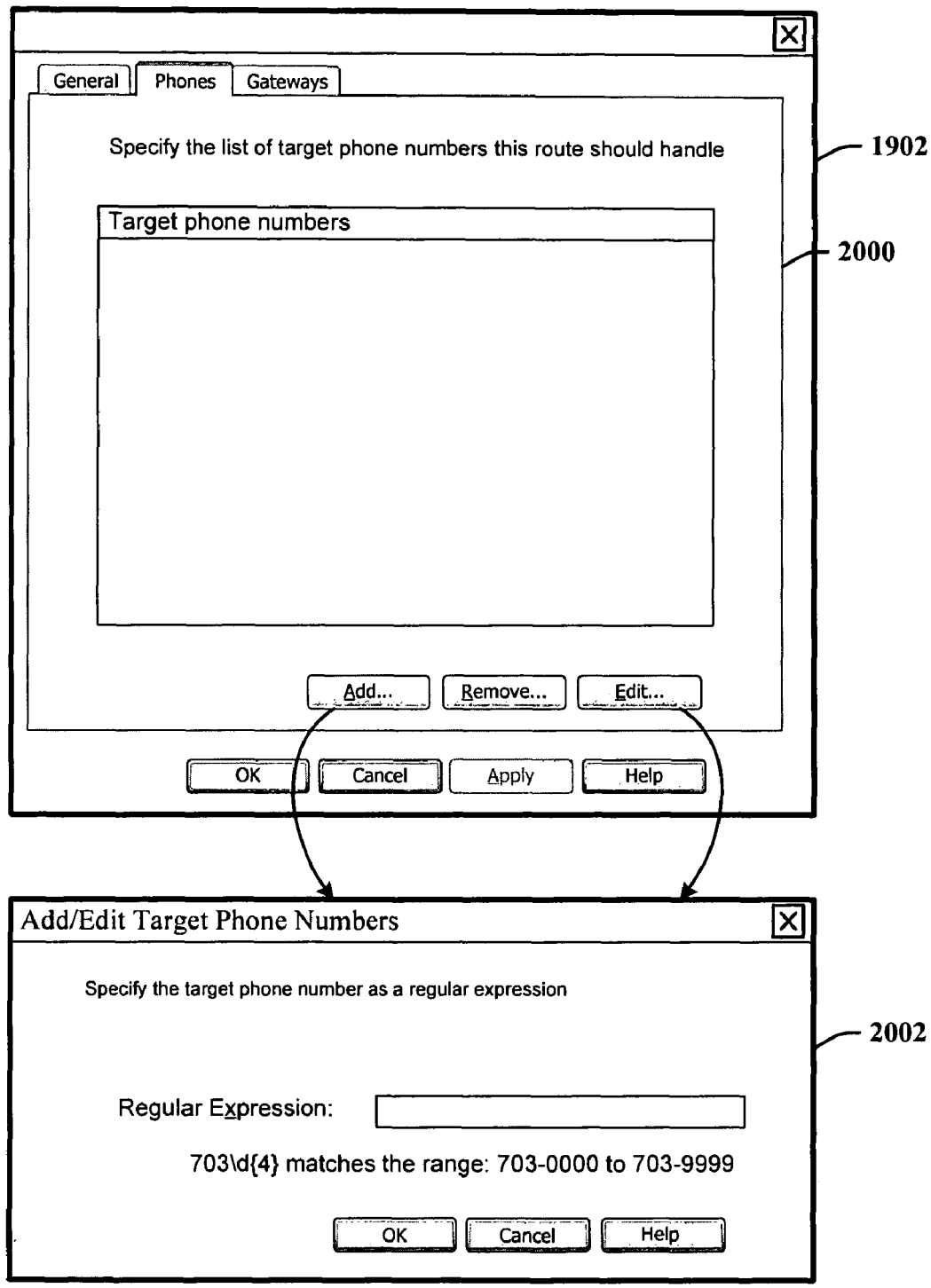
FIG. 20 illustrates the UI presented when selecting the Phones tab of a window of FIG. 19.

FIG. 20 illustrates the UI presented when selecting the Phones tab of the window 1902 of FIG. 19. The Phones tab exposes an input and/or selection subwindow 2000 that facilitates specifying target phone numbers for a phone route. By selecting an Add button or Edit button, of the subwindow 2000, an Add/Edit window 2002 opens that allows the administrator to manage target phone numbers by entering a regular expression that defines a range of phone numbers, for example.

Figure 21:
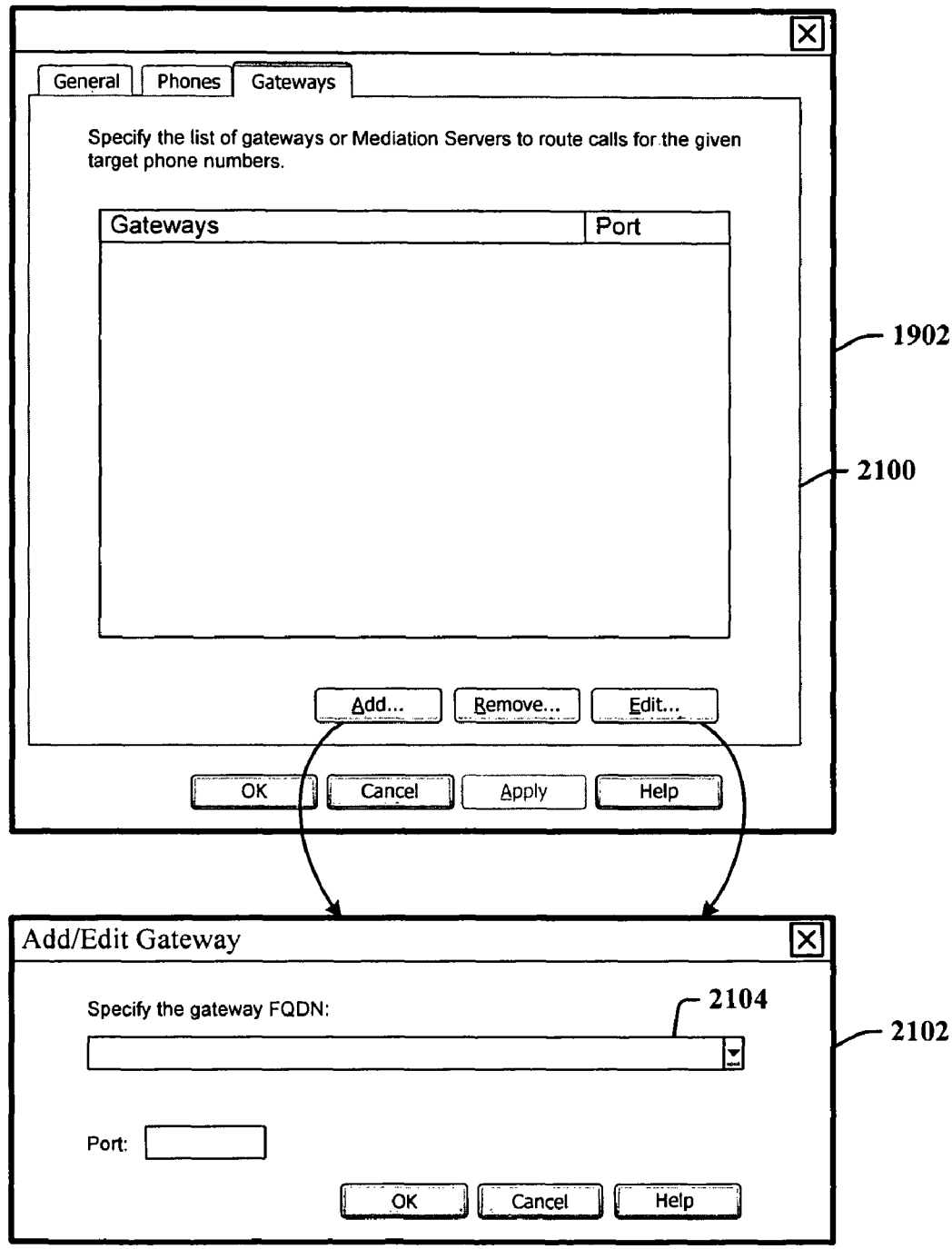
FIG. 21 illustrates the UI presented when selecting the Gateways tab of a window of FIG. 19.

FIG. 21 illustrates a UI presented when selecting the Gateways tab of the window 1902 of FIG. 19. The Gateways tab exposes an input and/or selection subwindow 2100 that facilitates specifying target phone numbers for a phone route. The administrator can specify one or more gateways when creating a phone route. By selecting an Add button or Edit button, of the subwindow 2100, an Add/Edit window 2102 opens that allows the administrator to manage gateways, for example. The window 2102 allows the administrator specify gateway FQDN data from a drop-down menu 2104, and port data. The drop-down menu 2104 is a pre-populated list of trusted mediation gateway objects which can be accessed from the directory service. Once the administrator selects a gateway FQDN from the drop-down menu 2104, the port field can be pre-populated with a list of listening ports belonging to each instance created in the mediation server.

It is within contemplation of the subject architecture that flexibility can be provided in the UI by allowing the customer (or vendor) customize the UI for their own purposes or applications. In particular, vendors can be allowed to develop and employ their own dialog boxes, display rules and usage policies. Additionally, scripts can be written and executed (as well as executable files) for automating functions or processes in support of call management and UI customization, for example. Furthermore, users can be provided the capability to employ their own logic behind policies, for example. A DLL (dynamic link library) can be developed and employed for execution of their own predicate logic for call management.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. With respect to servers, services, and telephone management systems (e.g., PBX, VoIP) and networks, a component can be software and/or hardware provided for storing objects, receiving, processing, and routing phone calls and call-related information, as well as call networks and network entities that facilitate call routing across networks (e.g., cellular, PSTN).

Figure 22:
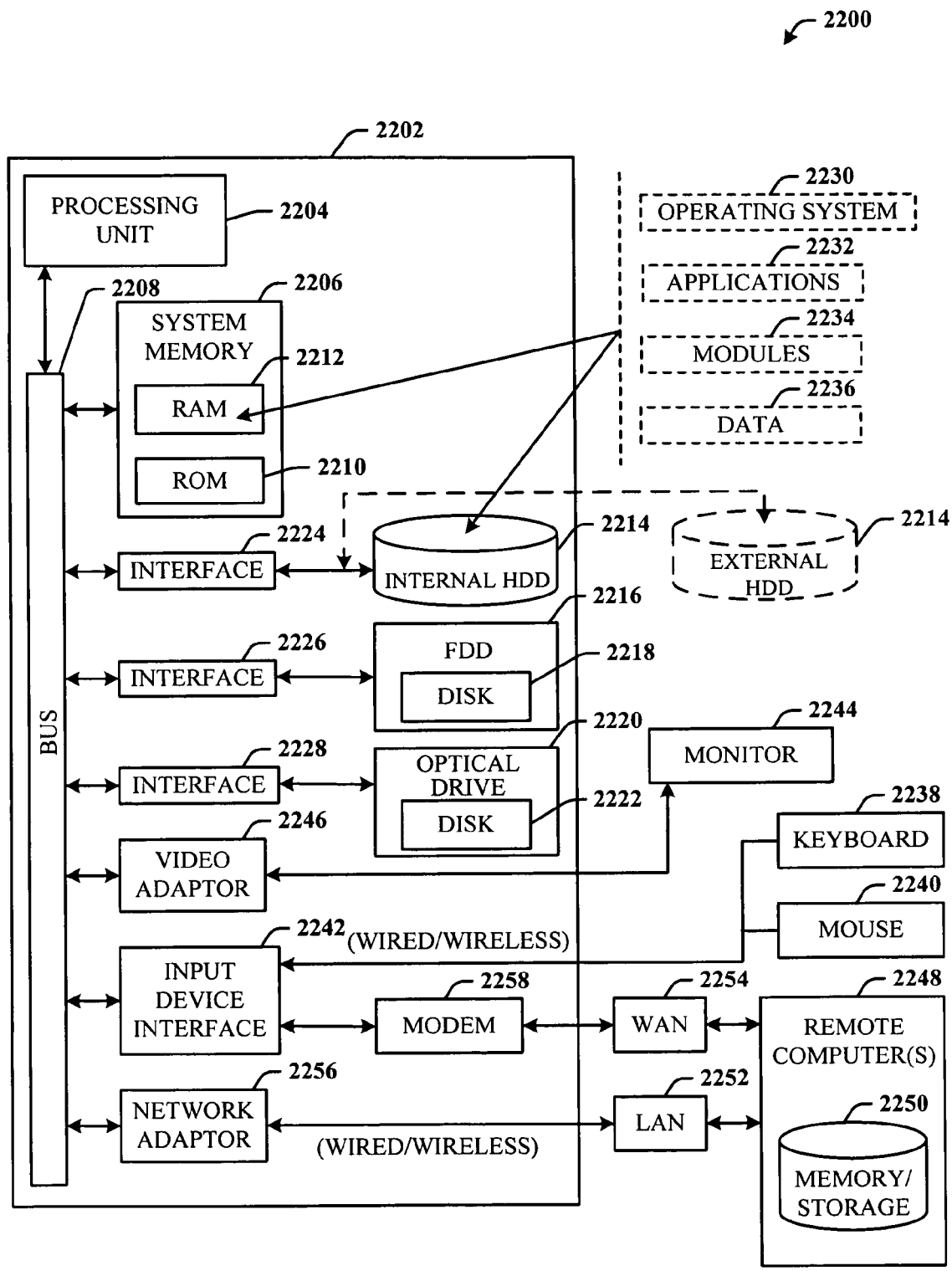
FIG. 22 illustrates a block diagram of a computer (or server) operable to execute directory services and call routing rules in accordance with the disclosed architecture.

Referring now to FIG. 22, there is illustrated a block diagram of a computer (or server) operable to execute directory services and call routing rules in accordance with the disclosed architecture. In order to provide additional context for various aspects thereof, FIG. 22 and the following discussion are intended to provide a brief, general description of a suitable computing environment 2200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 22, the exemplary environment 2200 for implementing various aspects includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read-only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is to be appreciated that the innovation can be implemented with various commercially available operating systems or combinations of operating systems.

A user can enter commands and information into the computer 2202 through one or more wired/wireless input devices, for example, a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, for example, a wide area network (WAN) 2254. Such LAN and WAN networking environments are commonplace in offices and companies, and facilitate enterprise-wide computer networks, such as intranets, all of which may connect to a global communications network, for example, the Internet.

When used in a LAN networking environment, the computer 2202 is connected to the local network 2252 through a wired and/or wireless communication network interface or adapter 2256. The adaptor 2256 may facilitate wired or wireless communication to the LAN 2252, which may also include a wireless access point disposed thereon for communicating with the wireless adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections, shown are exemplary and other means of establishing a communications link between the computers can be used.

The computer 2202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 23:
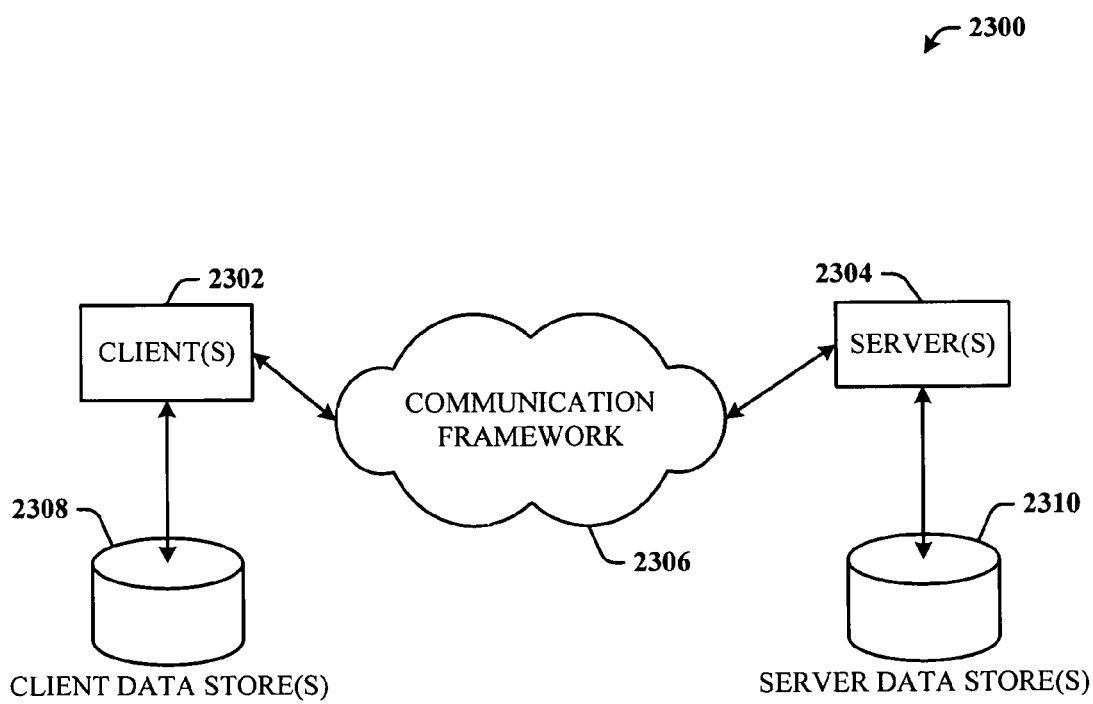
FIG. 23 illustrates a schematic block diagram of an exemplary computing environment that supports directory services for call management in accordance with the disclosed architecture.

Referring now to FIG. 23, there is illustrated a schematic block diagram of an exemplary computing environment 2300 that supports directory services for call management in accordance with the disclosed architecture. The system 2300 includes one or more client(s) 2302. The client(s) 2302 can be hardware and/or software (e.g., threads, processes, computing devices). The client(s) 2302 can house cookie(s) and/or associated contextual information by employing the subject innovation, for example.

The system 2300 also includes one or more server(s) 2304. The server(s) 2304 can also be hardware and/or software (e.g., threads, processes, computing devices). The servers 2304 can house threads to perform transformations by employing the architecture, for example. One possible communication between a client 2302 and a server 2304 can be in the form of a data packet adapted to be transmitted between two or more computer processes. The data packet may include a cookie and/or associated contextual information, for example. The system 2300 includes a communication framework 2306 (e.g., a global communication network such as the Internet) that can be employed to facilitate communications between the client(s) 2302 and the server(s) 2304.

Communications can be facilitated via a wired (including optical fiber) and/or wireless technology. The client(s) 2302 are operatively connected to one or more client data store(s) 2308 that can be employed to store information local to the client(s) 2302 (e.g., cookie(s) and/or associated contextual information). Similarly, the server(s) 2304 are operatively connected to one or more server data store(s) 2310 that can be employed to store information local to the servers 2304.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates call management, comprising:
    a schema component for generating a directory services schema; and
    a call routing component that routes a telephone call according to a call routing rule, which is defined by the schema as an instance of a class.

2. The system of claim 1, wherein the instance of the class represents the routing rule as an object oriented class.

3. The system of claim 1, wherein the routing rule defined by the schema is a least cost routing rule.

4. The system of claim 1, wherein the schema facilitates searching a table of the routing rules based on a range or pattern of telephone numbers included in the rules.

5. The system of claim 1, wherein the schema facilitates matching of the routing rule based on a string match.

6. The system of claim 1, wherein the schema component facilitates generation of a policy of one or more usage attributes defined by the schema.

7. The system of claim 6, wherein the call routing component routes the call based on processing of a routing rule and the policy.

8. The system of claim 1, wherein the schema defines at least one of route usage, a call route, a policy, and a mediation gateway.

9. The system of claim 1, further comprising a user interface that exposes directory services functionality related to call management.

10. The system of claim 1, further comprising a machine learning and reasoning component that employs a probabilistic and/or statistical-based analysis to prognose or infer an action that a user desires to be automatically performed.

11. The system of claim 1, further comprising a mediation component for controlling a route over which the call will be routed.

12. A computer-implemented method of managing calls, comprising:
    generating a directory services schema that represents call routing data as one or more routing rules;
    storing the one or more rules in a routing table, the one or more rules comprise a number pattern against which a call is processed, a usage attribute for policy processing, and a gateway address;
    exposing the one or more rules based on the call; and
    routing the call over a call network based on the one or more rules.

13. The method of claim 12, further comprising connecting the call when a usage attribute of the one or more rules matches a usage attribute of the policy, and failing the call when the usage attribute of the one or more rules does not match a usage attribute of the policy.

14. The method of claim 12, further comprising propagating the one or more routing rules from a first directory services component to a second directory services component based on a change in the one or more routing rules.

15. The method of claim 12, further comprising representing policy data as one or more usage attributes defined in the directory services schema.

16. The method of claim 15, further comprising defining the call routing rules and usage data as classes and instances of classes in the schema.

17. The method of claim 12, further comprising utilizing distinguished names to automatically maintain integrity of links across the classes defined in the schema.

18. The method of claim 12, further comprising providing a usage table for customization of the one or more routing rules.

19. The method of claim 12, further comprising routing the call to a gateway specified by a class in the schema.

20. A computer-executable system for call management, comprising:
- computer-implemented means for generating a directory services schema that represents call routing data as one or more rules;
- computer-implemented means for representing the call routing data as instances of classes;
- computer-implemented means for storing the one or more rules in a routing table;
- computer-implemented means for exposing the one or more rules based on a call number; and
- computer-implemented means for routing the call over a call network based on the call number and matching usage data of the one or more rules.

* * * * *